(12) United States Patent
Fujita et al.

(10) Patent No.: US 7,993,426 B2
(45) Date of Patent: Aug. 9, 2011

(54) MOISTURE SEPARATOR

(75) Inventors: Issaku Fujita, Takasago (JP); Nobuki Uda, Takasago (JP); Jiro Kasahara, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 279 days.

(21) Appl. No.: 12/309,918

(22) PCT Filed: Jan. 10, 2007

(86) PCT No.: PCT/JP2007/050137
§ 371 (c)(1),
(2), (4) Date: Feb. 3, 2009

(87) PCT Pub. No.: WO2008/026325
PCT Pub. Date: Mar. 6, 2008

(65) Prior Publication Data
US 2009/0288418 A1  Nov. 26, 2009

(30) Foreign Application Priority Data
Aug. 28, 2006 (JP) ................................. 2006-230358

(51) Int. Cl.
*B01D 45/00* (2006.01)
(52) U.S. Cl. ............... 55/423; 55/426; 55/424; 55/392; 55/394; 55/434.3; 55/434.2; 55/462; 55/465; 55/414; 55/421; 55/459.1; 55/466; 60/657; 60/677; 122/489; 122/483; 261/DIG. 10; 137/171; 137/172; 137/177; 96/189; 96/188; 96/190

(58) Field of Classification Search ................ 55/423, 55/426, 424, 392, 394, 434.3, 434.2, 462, 55/465; 60/657, 677; 122/489, 483; 261/DIG. 10; 137/171, 172, 177
See application file for complete search history.

(56) References Cited

U.S. PATENT DOCUMENTS
2,368,443 A * 1/1945 Biery .......................... 122/491
(Continued)

FOREIGN PATENT DOCUMENTS
DE          2415137          10/1974
(Continued)

OTHER PUBLICATIONS
International Search Report mailed Apr. 3, 2007 for International Application No. PCT/JP2007/050137.

*Primary Examiner* — Jason M Greene
*Assistant Examiner* — Dung Bui
(74) *Attorney, Agent, or Firm* — Wenderoth, Lind & Ponack, L.L.P.

(57) ABSTRACT

In a moisture separator, a manifold that communicates with a steam inlet is disposed in a shell. A plurality of blowout outlets for steam is provided on a side of the manifold. A first support plate and a lower support frame are fixed to a lower part in the shell to compart a steam drift space and a drain path. A moisture separating element is provided corresponding to the manifold, and steam from which moisture is removed by the moisture separating element is heated by a group of heating tubes to flow as high-temperature reheat steam to the steam outlet. The moisture is led from the drain opening through the drain path to the drain outlet. A blocking plate blocks a part of the drain opening.

11 Claims, 13 Drawing Sheets

U.S. PATENT DOCUMENTS

| | | | | | |
|---|---|---|---|---|---|
| 2,874,798 | A | * | 2/1959 | Walker | 95/213 |
| 3,574,303 | A | * | 4/1971 | Rabas | 122/483 |
| 3,593,500 | A | * | 7/1971 | Ritland et al. | 55/319 |
| 3,656,281 | A | * | 4/1972 | Bansal et al. | 55/482.1 |
| 3,667,430 | A | * | 6/1972 | Hubble et al. | 122/483 |
| 3,712,272 | A | * | 1/1973 | Carnavos et al. | 122/483 |
| 3,713,278 | A | * | 1/1973 | Miller et al. | 55/418.1 |
| 3,744,459 | A | * | 7/1973 | Reed | 122/483 |
| 3,745,978 | A | * | 7/1973 | Armand | 122/483 |
| 3,750,371 | A | * | 8/1973 | Gutman | 55/419 |
| 3,863,608 | A | * | 2/1975 | Yasugahira et al. | 122/483 |
| 3,923,008 | A | * | 12/1975 | Beckmann et al. | 122/34 |
| 3,923,009 | A | * | 12/1975 | Sohma | 122/34 |
| 3,923,010 | A | * | 12/1975 | Chlique | 122/483 |
| 3,996,897 | A | * | 12/1976 | Herzog | 122/483 |
| 4,007,518 | A | * | 2/1977 | Larson | 28/249 |
| 4,015,562 | A | * | 4/1977 | Yousoufian | 122/483 |
| 4,016,835 | A | * | 4/1977 | Yarden et al. | 122/483 |
| 4,019,881 | A | * | 4/1977 | Herzog et al. | 55/459.2 |
| 4,047,506 | A | * | 9/1977 | Weber | 122/32 |
| 4,114,684 | A | * | 9/1978 | Jenis et al. | 165/82 |
| 4,136,734 | A | * | 1/1979 | Sasaki et al. | 165/111 |
| 4,143,619 | A | * | 3/1979 | Marjollet et al. | 122/483 |
| 4,156,403 | A | * | 5/1979 | Bessouat et al. | 122/483 |
| 4,248,181 | A | * | 2/1981 | Bessouat et al. | 122/483 |
| 4,302,227 | A | * | 11/1981 | Miller | 55/434.4 |
| 4,312,303 | A | * | 1/1982 | Sisk | 122/34 |
| 4,386,583 | A | * | 6/1983 | Rabas | 122/483 |
| 4,485,069 | A | * | 11/1984 | Byerley | 376/405 |
| 4,522,156 | A | * | 6/1985 | Chaix | 122/34 |
| 4,528,946 | A | * | 7/1985 | Greis | 122/483 |
| 4,530,814 | A | * | 7/1985 | Schluderberg | 376/317 |
| 4,589,893 | A | * | 5/1986 | Franzolini et al. | 55/434.4 |
| 4,607,689 | A | * | 8/1986 | Mochida et al. | 165/110 |
| 4,671,214 | A | * | 6/1987 | Alias et al. | 122/488 |
| 4,675,963 | A | * | 6/1987 | Franzolini et al. | 29/890.051 |
| 4,685,511 | A | * | 8/1987 | Sabatino | 165/82 |
| 4,702,308 | A | * | 10/1987 | Noe et al. | 165/76 |
| 4,708,093 | A | * | 11/1987 | Keintzel et al. | 122/483 |
| 4,714,054 | A | * | 12/1987 | Minard et al. | 122/483 |
| 4,717,400 | A | * | 1/1988 | Ozeki et al. | 55/434.3 |
| 4,856,461 | A | * | 8/1989 | Hayes | 122/488 |
| 4,898,123 | A | * | 2/1990 | Holcblat | 122/379 |
| 4,905,631 | A | * | 3/1990 | Hayes | 122/483 |
| 6,773,492 | B1 | * | 8/2004 | West | 96/189 |

FOREIGN PATENT DOCUMENTS

| | | |
|---|---|---|
| JP | 46-37043 | 10/1971 |
| JP | 58-210404 | 12/1983 |
| JP | 59-162915 | 10/1984 |
| JP | 59-181908 | 12/1984 |
| JP | 04-121502 | 4/1992 |
| JP | 4-082505 | 7/1992 |
| JP | 04-244996 | 9/1992 |
| JP | 2000-310401 | 11/2000 |
| JP | 2002-130609 | 5/2002 |

* cited by examiner

MOISTURE SEPARATOR

TECHNICAL FIELD

The present invention relates to a moisture separator that removes moisture from steam, and in particular is suitable to be applied to an atomic power plant and the like.

BACKGROUND ART

A pressurized water atomic power plant generates electricity, for example, by: using light water as atomic furnace coolant and neuron moderator in an atomic furnace to be made into high-temperature, high-pressure water that does not boil throughout a reactor core; sending the high-temperature, high-pressure water to a steam generator to generate steam by heat exchange; and sending the steam to a turbine generator. The pressurized water atomic furnace transmits heat from high-temperature, high-pressure primary coolant to secondary coolant via the steam generator, and generate vapor from the secondary coolant. In the steam generator, the primary coolant flows inside a number of small heat transfer tubes, heat is transferred to the secondary coolant flowing the outside to generate vapor, and the vapor is fed to the turbine generator.

The turbine generator has a steam turbine having a high-pressure turbine and a low-pressure turbine, and a power generator that generates electricity by output from the steam turbine. A moisture separator is generally provided between the high-pressure turbine and the low-pressure turbine. The moisture separator separates moisture included in low-pressure steam discharged from the high-pressure turbine, reheats the low-pressure steam, and supplies the low-pressure steam as overheated steam to the low-pressure turbine, thereby lowering outlet humidity wetness of the low-pressure turbine to prevent erosion, and improving heat efficiency of a turbine plant.

FIG. 14 is a schematic for showing a conventional moisture separator, and FIG. 15 is a sectional diagram for showing main parts of the conventional moisture separator.

As shown in FIGS. 14 and 15, in the conventional moisture separator, a heating tube 002 is inserted to a shell 001 having a cylindrical shape from one end, and two manifolds 003 are inserted below both the sides of the heating tube 002 from the other end. High-pressure heating steam from a steam generator is supplied to the heating tube 002, low-temperature reheat steam including moisture from a high-pressure turbine is supplied to each of the manifolds 003, and steam can be blown out into the shell 001 from a number of blowout outlets 004 formed on the sides of the manifolds 003.

A horizontal dividing bottom plate 005 is fixed at a lower part in the shell; thereby, a drain path 006 is comparted below the dividing bottom plate 005, and a drain outlet 007 for discharging drain (moisture) of the drain path 006 to the shell 001 is formed. A pair of right and left moisture separating elements 008 corresponding to each of the manifolds 003 is fixed to the dividing bottom plate 005. The moisture separating elements 008 are supported by upper and lower support frames 008b, 008c while a number of wave-shaped separator vanes 008a are laminated at a predetermined interval, and a drain slit 008d is formed on the lower support frame 008c.

A pair of right and left dividing side plates 009 is fixed to an upper part of each of the moisture separating element 008, the heating tube 002 is positioned above the pair of the dividing side plates 009, and a steam outlet 010 for discharging steam from which moisture is separated is formed on the shell 001 positioned above the heating tube 002. The high temperature reheat steam discharged from the steam outlet 010 is sent to a low-pressure turbine.

Accordingly, the low-temperature reheat steam from the high-pressure turbine is blown out from the blowout outlets (manifold slit) 004 into the shell 001 after passing each of the manifolds 003, and is introduced into each of the moisture separating elements 008, guided by inner wall surfaces. When the steam passes the moisture separating element 008, moisture is separated by colliding the separator vane 008a. The steam from which moisture is separated rises through the pair of the right and left dividing side plates 009, and heated by contacting the heating tube, and is discharged from the steam outlet 010 as the high-temperature reheat steam. The moisture separated by the moisture separating element 008 passes the drain slit 008d, flows down to the drain path 006, and is discharged from the drain outlet 007 to the outside.

Examples of such a moisture separator include those described in the following Patent Documents 1, 2, and 3.

[Patent Document 1] Japanese Patent Application Laid-open No. 2002-130609
[Patent Document 2] Japanese Utility Model Application Laid-open No. H04-082505
[Patent Document 3] Japanese Patent Application Laid-open No. 2000-310401

SUMMARY OF THE INVENTION

Problem to be Solved by the Invention

Regarding the moisture separator, downsizing of the apparatus is desired, and, in order to achieve the downsizing, diameters of the shell or the manifolds need to be downsized. In the conventional moisture separator described above, moisture is separated from steam when the low-temperature reheat steam passes the manifolds 003, is blown out from a number of the manifold slit 004 into the shell 001, and passes the moisture separating element 008. When the diameter of the manifolds 003 is downsized in this case, the flow speed of the steam flowing in the manifolds 003 increases, and the steam blown out from the blowout outlet 004 collides a partition wall of the shell 001 at the leading end side, and recovers static pressure; therefore, a pressure distribution in the shell 001 is generated. In other words, the pressure in the shell 001 is low (pressure P1) at the base end side of the manifolds 003, and is high (pressure P1) at the leading end side.

When a pressure difference (P1, P2) is generated in the manifold 003, a pressure P3 of the drain path 006 is dominated by the high pressure P2 of the leading end side of the manifolds 003. Accordingly, the pressure P1 of the base end side of the manifolds 003 becomes low. The steam in the drain path 006 blows up from the drain slit 008d to the moisture separating element 008 side together with drain (moisture), the separated moisture cannot be discharged to the drain path 006, and also the steam from which moisture is separated carries the drain blown up from the drain slit 008d; thereby, the moisture separation performance of the moisture separating element 008 deteriorates.

The present invention solves the above-described problems, and an object thereof is to provide a moisture separator aimed to restrain reverse flow of moisture from a drain path to a moisture separating element side to improve the moisture separation performance.

Means for Solving Problem

According to an aspect of the present invention, a moisture separator includes: a shell having a hollow shape; a steam inlet for introducing steam containing moisture into the shell; a moisture separating element that is provided in the shell, and separates the moisture contained in the steam that is supplied from the steam inlet and passes the moisture separating element; a steam outlet for discharging the steam after the moisture is extracted in the moisture separating element, the steam outlet being provided on an upper part of the shell; a drain outlet for discharging the moisture separated from the steam in the moisture separating element, the drain outlet being provided on a lower part of the shell; a first dividing wall for comparting a steam drift space and a drain path, the steam drift space causing the steam introduced from the steam inlet to pass the moisture separating element and to flow to the steam outlet, the drain path leading the moisture separated in the moisture separating element to the drain outlet; a drain flow path for communicating the steam drift space and the drain path to flow the moisture separated in the moisture separating element to the drain path; and a blow-up restraining unit for restraining the moisture of the drain path from passing the drain flow path to blow up to the steam drift space side.

In the moisture separator, the blow-up restraining unit may be provided to the drain flow path positioned near the steam inlet.

In the moisture separator, the drain flow path may be a drain opening formed on the first dividing wall below the moisture separating element, and a throttle unit as the blow-up restraining unit may be provided to the drain opening.

In the moisture separator, the steam drift space may be comparted by a second dividing wall with the moisture separating element as a boundary thereof into a steam supply space in which the steam introduced from the steam inlet flows to the moisture separating element, and a steam discharging space in which the steam from which the moisture is separated by the moisture separating element may flow to the steam outlet, and the drain flow path may have a first flow path having an aduncate shape that communicates the steam supply space and the drain path, and a second flow path that communicates the steam discharging space and the first flow path.

In the moisture separator, the drain flow path may have a downflow flow path that penetrates the first dividing wall below the moisture separating element, and a U-shaped flow path that is provided to an end of the downflow flow path on the drain path side.

In the moisture separator, a gas venting hole may be provide to an end of the downflow flow path on the steam discharging space side, and a moisture scattering preventing wall may be provided above the gas venting hole.

In the moisture separator, a gas venting hole that penetrates the moisture separating element may be provided to an end of the downflow flow path on the steam discharging space side.

In the moisture separator, the moisture separating element may be divided by a maintenance space into at least two portions, one portion being on the steam inlet side and the other portion being on a far side, and the drain flow path may have a drain opening formed on the first dividing wall below the moisture separating element provided at the far side, and a bypass flow path that communicates divided portions of the moisture separating element.

In the moisture separator, an intermediate partition wall that comparts the steam drift space into a space on the steam inlet side and a space on a far side may be provided near the steam inlet, and the blow-up restraining unit may be provided in the space on the steam inlet side.

In the moisture separator, the shell may have a horizontally placed cylindrical shape, the steam inlet may be formed at one end of the shell in a longitudinal direction thereof, two manifolds that communicate with the steam inlet may be inserted inside the shell, sides of the manifolds may have a plurality of blowout outlets that are for blowing out the steam into the shell, the first dividing wall may be fixed to a lower part in the shell to compart the steam drift space and the drain path, the moisture separating elements may be provided on the first dividing wall corresponding to the two manifolds, the moisture contained in the steam that is blown out from the blowout outlet of each of the manifolds and passes the moisture separating element may be removed from the steam, the steam from which the moisture is removed may flow to the steam outlet, and the moisture may pass from the drain flow path through the drain path to be led to the drain outlet.

In the moisture separator, a heating tube may be inserted from another end of the shell in the longitudinal direction above each of the manifolds, a second dividing wall with the moisture separating element as a boundary thereof may be fixed to both sides in the shell to compart the steam supply space and the steam discharging space, and the steam from which the moisture is removed by passing each of the moisture separating elements may flow from the steam discharging space to contact and be heated by the heating tube to the steam outlet.

Effect of the Invention

In a moisture separator according to the present invention, a moisture separating element that separates moisture is provided in a shell having a steam inlet; a steam outlet that is for discharging steam from which the moisture is separated is provided to an upper part of the shell; a drain outlet that is for discharging the moisture is provided to a lower end of the shell; a first dividing wall comparts a steam drift space in which the steam passes the moisture separating element and flows to the steam outlet, and a drain path that leads the moisture to the drain outlet; a drain flow path that communicates the steam drift space and the drain path to flow the separated moisture to the drain path; and a blow-up restraining unit that restrains the moisture of the drain path from passing the drain flow path to blow up to the steam drift space side.

Accordingly, the moisture contained in the steam that is introduced from the steam inlet to the inside of the shell and passes the moisture separating element is separated from the steam, the steam from which the moisture is separated is discharged from the steam outlet, and the moisture moves from the drain flow path to the drain path to be discharged from the drain outlet. At this time, even when a pressure distribution of steam is generated in the steam drift space, and a pressure difference is generated between the pressures of the steam drift space and the drain path, the blow-up restraining unit restrains a phenomenon that the moisture of the drain path passes the drain flow path to blow up to the steam drift space side, and restrains a reverse flow of the moisture from the drain path to the moisture separating element side; thereby, the moisture separation performance can be improved.

In a moisture separator according to the present invention, the blow-up restraining unit is provided to the drain flow path positioned near the steam inlet. When the steam containing the moisture is introduced from the steam inlet to the inside of the shell, the pressure distribution is likely to be generated between the near part to the steam inlet and the far part in the shell due to the flow speed of the steam, and a pressure difference is generated between the pressures of the steam drift space and the drain path near the steam inlet. Because the blow-up restraining unit is provided near the steam inlet, the blow-up of the moisture can be restrained properly.

In a moisture separator according to the present invention, the drain flow path is a drain opening formed on the first dividing wall below the moisture separating element, and a throttle unit as the blow-up restraining unit is provided to the drain opening. Accordingly, the blow-up of the moisture can be restrained with a simple configuration.

In a moisture separator according to the present invention, a second dividing wall with the moisture separating element as its boundary comparts the steam drift space into a steam supply space in which the steam introduced from the steam inlet flows to the moisture separating element, and a steam discharging space in which the steam from which the moisture is separated by the moisture separating element flows to the steam outlet, and a fist flow path having an aduncate shape that communicates the steam supply space and the drain path, and a second flow path that communicates the steam discharging space and the fist flow path are provided as the drain flow path. Accordingly, because the moisture separated by the moisture separating element passes from the second flow path through the first flow path to move to the drain path, and the first flow path has an aduncate shape, the blow-up of the moisture can be surely prevented.

In a moisture separator according to the present invention, a downflow flow path that penetrates the first dividing wall below the moisture separating element, and a U-shaped flow path provided to an end of the downflow flow path on the drain path side are provided as the drain flow path. Accordingly, because the moisture separated by the moisture separating element passes from the downflow flow path through the U-shaped flow path to move to the drain path, and the U-shaped flow path configures a loop seal by the moisture retained therein, the loop seal properly restrains the blow-up of the moisture.

In a moisture separator according to the present invention, a gas venting hole is provided to an end of the downflow flow path on the steam discharging space side, and a moisture scattering preventing wall is provided above the gas venting hole. Accordingly, when a pressure gradient is generated in the downflow flow path, the inside pressure can be maintained uniform by releasing the inside pressure from the gas venting hole, and the blow-up of the moisture immediately after activation can be restrained by the moisture scattering preventing wall.

In a moisture separator according to the present invention, a gas venting hole that penetrates the moisture separating element is provided at the end of the downflow flow path on the steam discharging space side. Accordingly, when a pressure gradient is generated in the downflow flow path, the inside pressure can be maintained uniform by releasing the inside pressure from the gas venting hole. Moreover, the moisture separation performance can be improved by releasing the pressure to the moisture separating element side.

In a moisture separator according to the present invention, the moisture separating elements are divided into at least two groups, those on the steam inlet side and those on the far side, by a maintenance space, and a drain opening formed on the first dividing wall below the moisture separating element on the far side, and a bypass flow path that communicates the divided moisture separating elements are provided as the drain flow path; therefore, the moisture separated by the moisture separating element on the steam inlet side passes the bypass flow path to move to the moisture separating element on the far side, and moves from the drain opening to the drain path. Accordingly, blow-up of the moisture from the drain flow path positioned on the steam inlet side can surely be prevented.

In a moisture separator according to the present invention, an intermediate partition wall that comparts the steam drift space into a space on the steam inlet side and a space on the far side is provided near the steam inlet, and a blow-up restraining unit is provided in the space on the steam inlet side; therefore, blow-up of the moisture that is likely to be generated in the space on the steam inlet side can surely be restrained.

In a moisture separator according to the present invention, the shell has a horizontally placed cylindrical shape; a steam inlet is formed on one end of the shell in the longitudinal direction; two manifolds that communicate with the steam inlet are inserted into the shell; a plurality of blowout outlets for the steam are provided on the side of the manifolds; a first dividing wall is fixed to the lower part of the shell to compart the steam drift space and the drain path; the moisture separating elements are provided on the first dividing wall corresponding to the two manifolds; moisture is removed from steam that has been blown out from the blowout outlet of each of the manifolds, and passed each of the moisture separating elements; and the steam from which the moisture is removed flows to the steam outlet, while the moisture is led from drain flow path through the drain path to the drain outlet; therefore, the steam can flow in the shell efficiently, and the moisture can be separated properly.

In a moisture separator according to the present invention, a heating tube is inserted from the other end of the shell in the longitudinal direction above each of the manifolds; a second dividing wall with the moisture separating element as its boundary is fixed to both the sides in the shell to compart the steam supply space and the steam discharging space; and steam from which moisture is removed after passing each of the moisture separating element flows from the steam discharging space to the steam outlet after contacting the heating tube and being heated; therefore, effective use of the steam can be realized because the steam from which the moisture is separated is discharged after being heated.

EXPLANATIONS OF LETTERS OR NUMERALS

Figure 1:
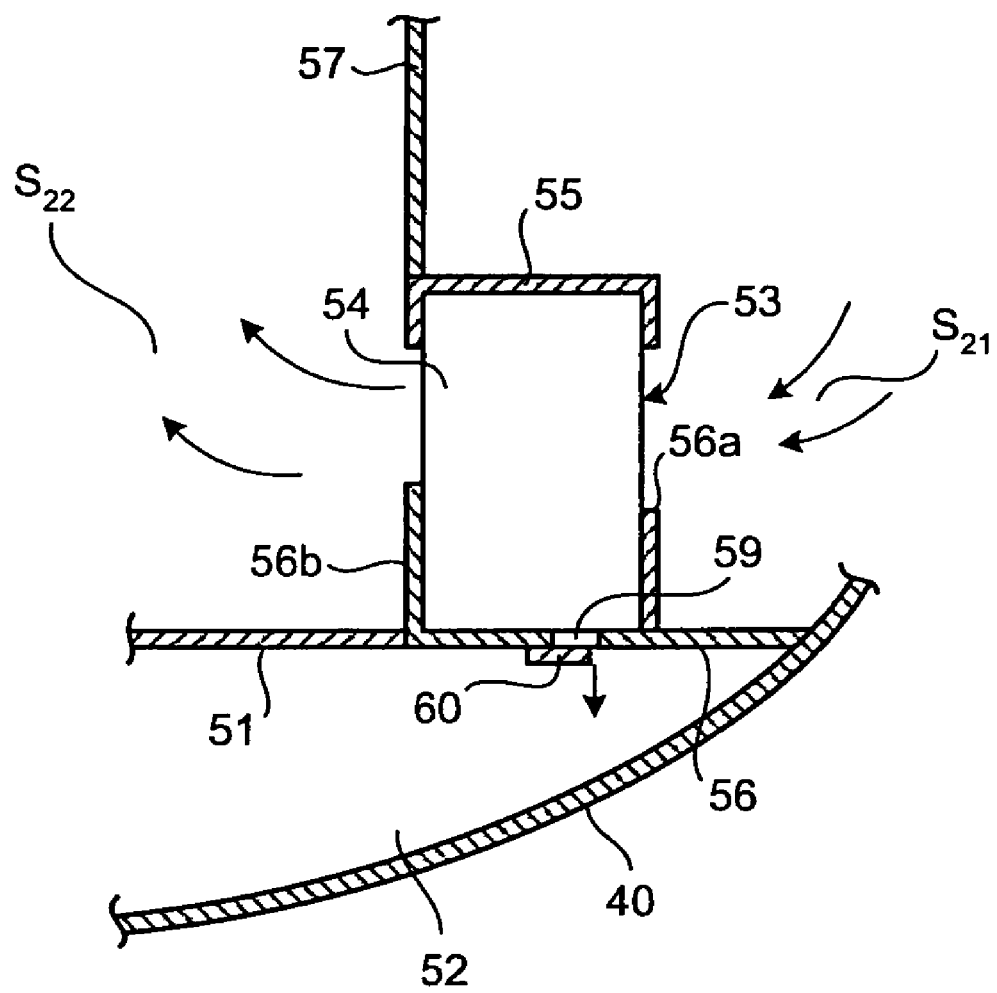
FIG. 1 is a sectional diagram for showing main parts of a moisture separator according to a first embodiment of the present invention.

11 steam generator
12 steam turbine
13 coolant pipe
14 high-pressure turbine
15 low-pressure turbine
16 power generator
17 moisture separator
40 shell
41 steam inlet
42 steam outlet
43 drain outlet
44 heating tube group
46 heating tube
49 manifold
50 manifold slit
51 first support plate (first dividing wall)
52 drain path
53, 53a, 53b moisture separating element
55 upper support frame (second dividing wall)
56 lower support frame (first dividing wall)
57 second support plate (second dividing wall)
58 jack bolt
59 drain opening (drain flow path)
60, 61 blocking plate (blow-up restraining unit, throttle unit)
62 upper part dividing plate
63 lower part dividing plate
64 duct
71 header
72 communicating opening
73 duct
74 retaining part
75 gas venting hole
76 gas venting hole
77 moisture scattering preventing wall
81 duct (drain flow path)
91 intermediate partition wall
$P_1$ first flow path (drain flow path)
$P_2$ second flow path (drain flow path)
$P_3$ downflow flow path (drain flow path)
$P_4$ U-shaped flow path (drain flow path)
$S_1$ steam drift space
$S_{21}$ steam supply space
$S_{22}$ steam discharging space

DETAILED DESCRIPTION OF THE INVENTION

Exemplary embodiments of a moisture separator according to the present invention will be explained in detail with reference to the accompanying drawings. The present invention is not limited by the embodiments.

First Embodiment

Figure 2:
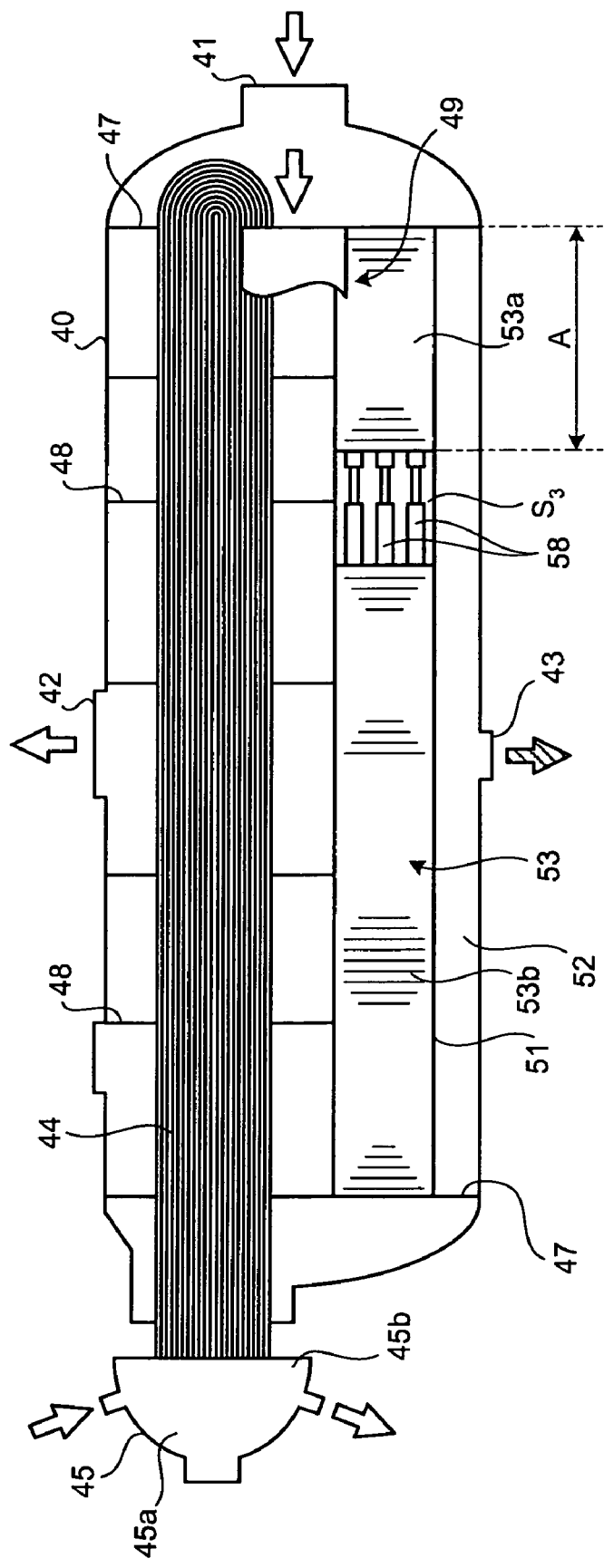
FIG. 2 is a schematic for showing the moisture separator according to the first embodiment.
Figure 3:
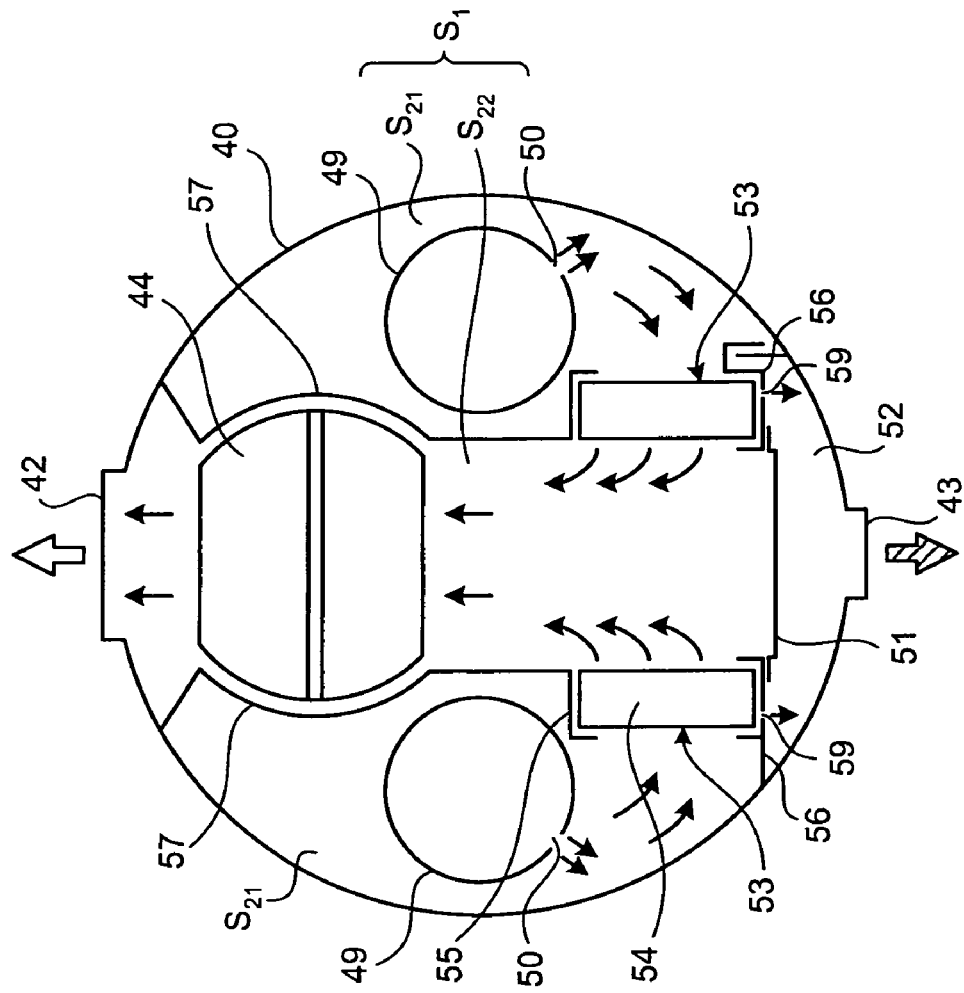
FIG. 3 is a longitudinal sectional diagram for showing the moisture separator according to the first embodiment.
Figure 4:
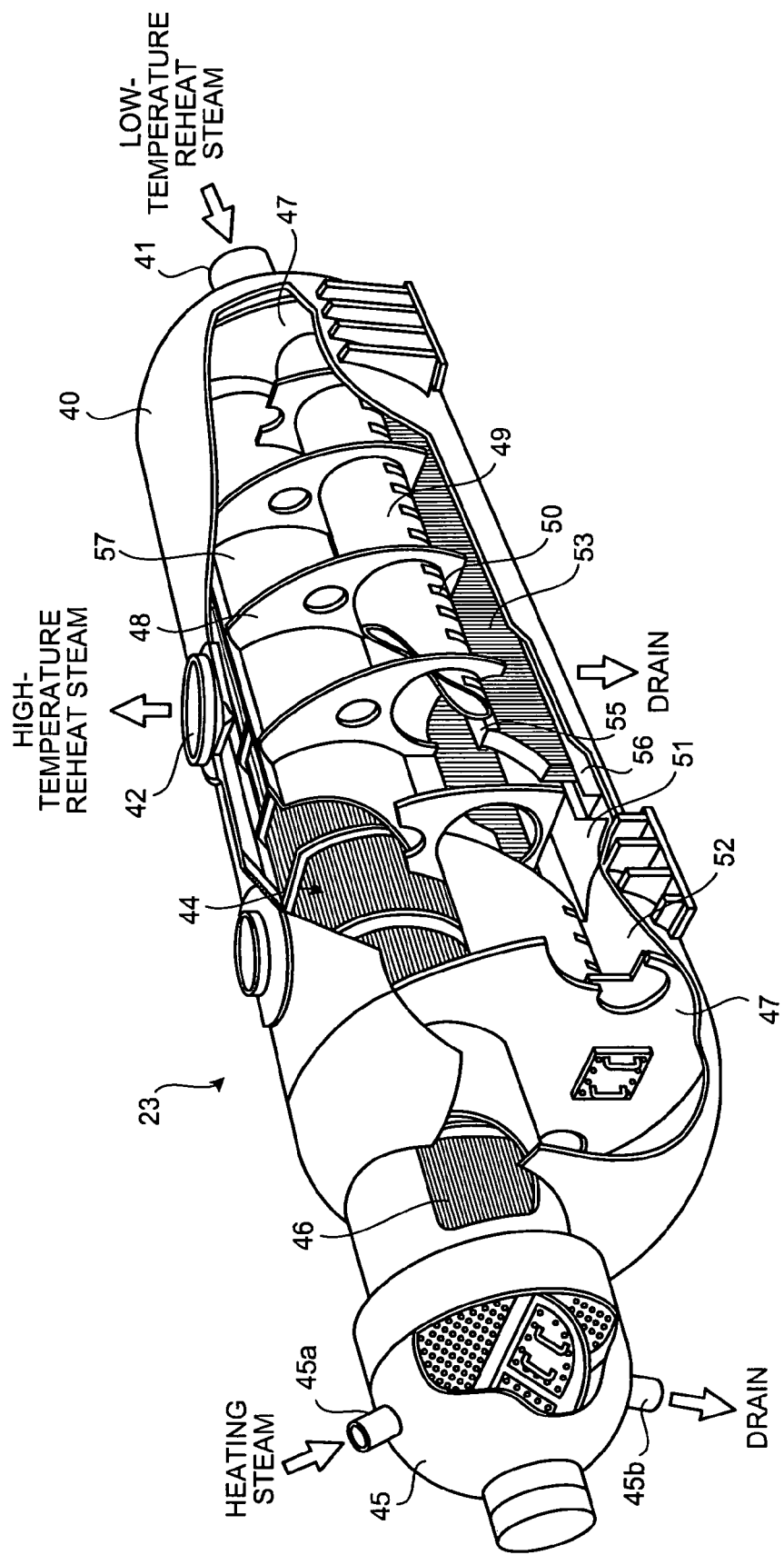
FIG. 4 is a cutaway perspective diagram for showing an inner structure of the moisture separator according to the first embodiment.
Figure 5:
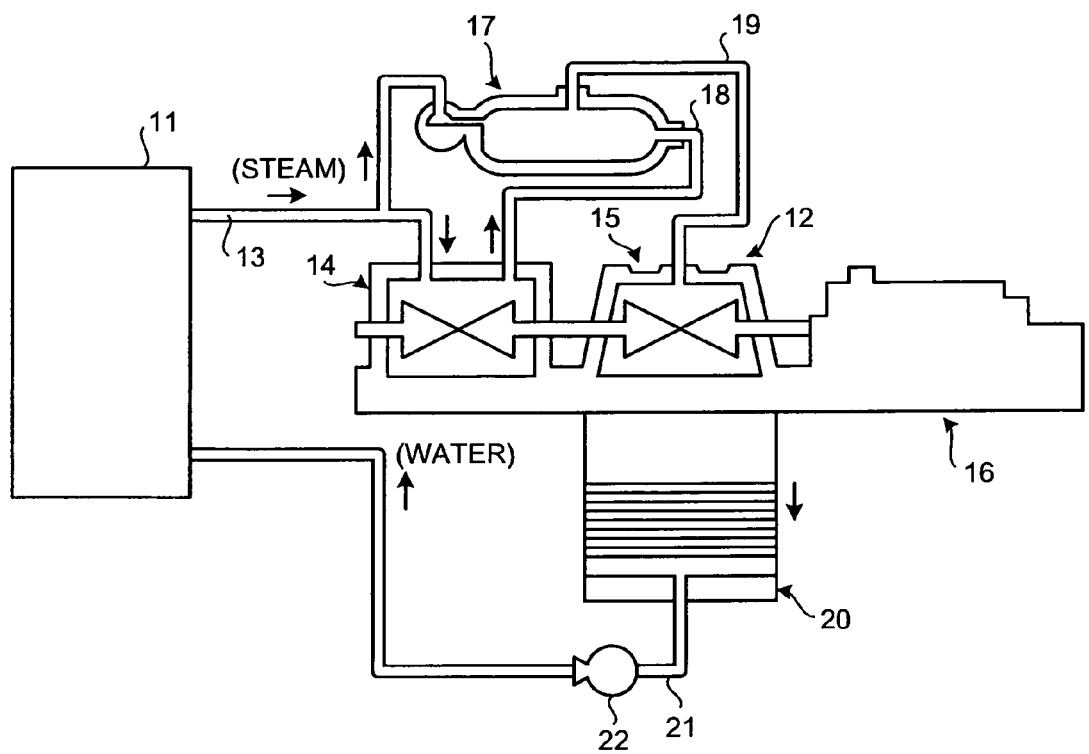
FIG. 5 is a schematic configuration diagram for showing an improved pressurized water atomic power plant to which the moisture separator according to the first embodiment is applied.

FIG. 1 is a sectional diagram for showing main parts of a moisture separator according to a first embodiment. FIG. 2 is a schematic for showing the moisture separator according to the first embodiment. FIG. 3 is a longitudinal sectional diagram for showing the moisture separator according to the first embodiment. FIG. 4 is a cutaway perspective diagram for showing an inner structure of the moisture separator according to the first embodiment. FIG. 5 is a schematic configuration diagram for showing a power plant to which the moisture separator according to the first embodiment is applied.

The power plant according to the embodiment may be applied to a pressurized water atomic furnace (PWR: pressurized water reactor) that generates electricity, for example, by: using light water as atomic furnace coolant and neuron moderator to be made into high-temperature, high-pressure water that does not boil throughout a reactor core; sending the high-temperature, high-pressure water to a steam generator to generate steam by heat exchange; and sending the steam to a turbine generator, or to an improved pressurized water atomic furnace (APWR: advanced pressurized water reactor) realized by improving the above-mentioned pressurized water atomic power plant. The power plant is also applicable to other power plants.

In other words, in the power plant according to the present embodiment as shown in FIG. 5, a steam generator 11 is coupled to a steam turbine 12 by a main steam pipe 13. The steam turbine 12 has a high-pressure turbine 14 and a low-pressure turbine 15. A power generator 16 is connected to the steam turbine 12. A moisture separator 17 is provided between the high-pressure turbine 14 and the low-pressure turbine 15. The high-pressure turbine 14 and the moisture separator 17 are coupled by a low-temperature reheating tube 18. The moisture separator 17 and the low-pressure turbine 15 are coupled by a high-temperature reheating tube 19. The steam turbine 12 has a condenser 20 and is coupled to the steam generator 11 by a main steam pipe 21. The main steam pipe 21 includes a condensing pump 22.

Accordingly, steam produced by heat exchange with high pressure, high temperature light water in the steam generator 11 is sent to the steam turbine 12 (from the high-pressure turbine 14 to the low-pressure turbine 15) through the main steam pipe 13, the steam turbine 12 is driven with the steam, and the power generator 16 generates electricity. After the steam from the steam generator 11 drives the high-pressure turbine 14, moisture contained in the steam is removed by the moisture separator 17, and the steam is heated, and then drives the low-pressure turbine 15. The steam that has driven the steam turbine 12 is cooled by the condenser 20, and then returns to the steam generator 11 through the main steam pipe 21.

In the moisture separator 17 according to the present embodiment, a shell 40 has a horizontally plated hollow cylindrical shape as shown in FIGS. 2 to 4. One end of the shell 40 is blocked, and the other end has a steam inlet 41 from which steam (low-temperature reheat steam) containing moisture is introduced. The upper part of the shell 40 has a steam outlet 42 that discharges steam (high-temperature reheat steam) from which the moisture is separated and which is heated, and the lower part has a drain outlet 43 that discharges the moisture (drain) separated from the steam. As shown in FIG. 5, the steam inlet 41 is coupled to the high-pressure turbine 14 by the low-temperature reheating tube 18.

The steam outlet 42 is coupled to the low-pressure turbine 15 by the high-temperature reheating tube 19. The drain outlet 43 is coupled to a drain tank by a drainpipe (not shown).

A group of heating tubes 44 is inserted from the one end of the shell 40 in the longitudinal direction as shown in FIGS. 2 to 4. The group of the heating tubes 44 includes a steam chamber 45 positioned outside the shell 40, and a plurality of heating tubes 46 forming a U-shape extended from the steam chamber 45 into the shell 40. The heating tubes 46 are supported by a pair of partition walls 47 fixed inside the shell 40, and a plurality of support walls 48 fixed between the partition walls 47. The inside of the steam chamber 45 is divided into upper and lower parts. A pipe branched from the main steam pipe 13 of the steam generator 11 is coupled to an inlet tube stand 45a on the upper side, to which one ends of the heating tubes 46 are coupled. A drainpipe extended to a drain tank is coupled to an outlet tube stand 45b on the lower side, to which the other ends of the heating tubes 46 are coupled.

A pair of right and left manifolds 49 is inserted from the other end of the shell 40 in the longitudinal direction, the manifolds 49 being positioned below both the sides of the group of heating tubes 44. The manifolds 49 penetrate the plurality of support walls 48, and leading ends thereof are fixed to one of the partition walls 47 and blocked. The base ends of the manifolds 49 are fixed to and penetrate the other one of the partition walls 47, and communicate with the steam inlet 41. A plurality of blowout outlets 50 for blowing out steam into the shell 40 is formed at sides of the manifolds 49 opposing the wall surface of the shell 40.

A first horizontal support plate 51 is fixed to the lower part in the shell 40. A pair of right and left moisture separating elements 53 is provided on both the sides of the first support plate 51, corresponding to the two manifolds 49. The moisture separating elements 53 are positioned opposing each of the blowout outlets 50 of the manifolds 49, and separate moisture from steam passing the moisture separating elements 53. In other words, the moisture separating elements 53 are supported by upper and lower support frames 55, 56, while a number of wave-shaped vanes 54 are laminated at a predetermined interval. In the present invention, a drain path 52 is comparted by fixing the lower support frame 56 on both the side of the first support plate integrally, and to the inner wall surface of the shell 40. The drain outlet 43 is provided below the drain path 52. In other words, the first support plate 51 and the lower support frame 56 form the first dividing wall of the present invention.

A pair of second support plates 57 is provided upright above each of the moisture separating elements 53. The second support plates 57 extend upward, curving along both the sides of the group of the heating tubes 44. The upper ends of the second support plates 57 are coupled to the shell 40, and the lower ends thereof are coupled to the upper support frame 55. Accordingly, the first dividing wall configured by the first support plate 51 and the lower support frame 56 comparts the inner space of the shell 40 into a steam drift space $S_1$ in which the steam blown out from the blowout outlet 50 of the manifold 49 passes the moisture separating element 53 to flow to the steam outlet 42, and the drain path 52 that leads the moisture separated by the moisture separating element 53 to the drain outlet 43. The second support plate 57 and the upper support frame 55 with the moisture separating element 53 as the boundary compart the steam drift space $S_1$ into a steam supply space $S_{21}$ in which the steam blown out from the blowout outlet 50 flows to the moisture separating element 53, and a steam discharging space $S_{22}$ in which the moisture separated by the moisture separating element 53 flows to the steam outlet 42. In other words, the second dividing wall according to the present invention is configured by the second support plate 57 and the upper support frame 55.

The moisture separating elements 53 disposed along the longitudinal direction of the shell 40 are divided into areas of two moisture separating elements 53a, 53b by a maintenance space $S_3$ on the steam inlet 41 side of the manifold 49. The moisture separating elements 53a, 53b are supported by a plurality of jack bolts 58 intervened therebetween.

As shown in FIG. 1, the moisture separating element 53 has the wave-shaped vanes 54 laminated at a predetermined interval, and is supported by the upper and the lower support frames 55, 56. The steam blown out from the blowout outlet 50 of the manifold 49 passes between the separator vanes 54, and accordingly the moisture contained in the steam collides the separator vanes 54 and is separated. The lower support frame 56 (first dividing wall) has a vertical wall 56a provided upright on the steam supply space $S_{21}$ side, and a vertical wall 56b provided upright on the steam discharging space $S_{22}$ side. The lower support frame wall 56 also has a drain opening (drain flow path) 59 communicating the moisture separating element 53 (steam drift space $S_1$) and the drain path 52, and accordingly can discharge the moisture separated by the separator vane 54, or the drain, to the drain path 52 passing through the drain opening 59.

According to the present embodiment, a blocking plate 60 is fixed to the lower surface of the lower support frame 56 to block a part of the drain opening 59, the blocking plate 60 serving as a blow-up restraining unit and a throttle unit for restraining blow-up of the moisture in the drain path 52 to the steam drift space $S_1$ side through the drain opening 59 due to pressure fluctuation in the shell 40. As shown in FIGS. 2 and 3, when the pressure fluctuation is generated in the shell 40 in the longitudinal direction, a phenomenon that the pressure in the steam drift space $S_1$ becomes lower than that in the drain path 52 on the steam inlet 41 side of the manifold 49 becomes noticeable, and the moisture in the drain path 52 may blow up to the steam drift space $S_1$ side through the drain opening 59. Therefore, the blocking plate 60 is provided on the drain opening 59, as shown in FIG. 1, in an area A where the moisture separating element 53 positioned on the steam inlet 41 side of the manifold 49, or the moisture separating elements 53a, 53b divided by the maintenance space $S_3$, are disposed.

The action of the moisture separation by the moisture separator 17 according to the present embodiment will now be explained with reference to FIGS. 1 to 5.

In the moisture separation by the moisture separator 17 according to the present embodiment, as shown in FIG. 5, heating steam produced by the steam generator 11 is sent through the main steam pipe 13 to the high pressure turbine 14 configuring the steam turbine 12, and to the moisture separator 17. Low-temperature reheat steam that has driven the high-pressure turbine 14 is sent through the low-temperature reheating tube 18 to the moisture separator 17. Moisture contained in the steam is removed and heated, becomes high-temperature reheat steam, and is sent through the high-temperature reheating tube 19 to the low-pressure turbine 15.

In the moisture separator 17, as shown in FIGS. 2 to 4, the heating steam produced by the steam generator 11 is supplied from the inlet tube stand 45a of the steam chamber 45 to the group of the heating tubes 44, returned through the heating tubes 46 disposed in the shell 40 to the steam chamber 45, and discharged as drain from the outlet tube stand 45b.

The low-temperature reheat steam from the high-pressure turbine is supplied from each of the steam inlet 41 into the manifold 49, and blown out from a number of the blowout outlets 50 to the steam supply space $S_{21}$ of the shell 40. The steam blown out into the steam supply space $S_{21}$ of the shell 40 is directed along the inner wall surface to each of the moisture separating elements 53. Then, in the moisture separating elements 53, the steam passes between the wave-shaped vanes 54, and the moisture contained in the steam collides the separator vanes 54 and is separated as drain.

The steam from which the moisture is separated by the moisture separating element 53 rises through the steam discharging space $S_{22}$ comparted by the right and left second support plates 57, and when passing between the heating tubes 46, the steam is heated by the heating steam passing each of the heating tubes 46, and is discharged as the high-temperature reheat steam from the steam outlet 42. The moisture (drain) separated from the steam by the moisture separating element 53 passes the drain opening 59, flows down to the drain path 52, and is discharged from the drain outlet 43 to the outside.

In the moisture separator 17 according to the present embodiment, diameters of the shell 40 and the manifold 49 are downsized for downsizing the apparatus. Accordingly, the flow speed of the steam flowing inside the manifold 49 increases, and the steam blown out from each of the blowout outlet 50 collides the leading end side of the manifold 49, or the partition wall 47 on the steam chamber 45 side (left side in FIG. 2), thereby recovering static pressure. Therefore, the pressure distribution is generated in the shell 40 in the longitudinal direction. In the longitudinal direction of the shell 40, the pressure on the leading end side where a large amount of the steam flows becomes higher than that on the steam inlet 41 side of the manifold 49, and the former pressure acts on the drain path 52 through a number of the drain openings 59. Accordingly, on the steam inlet 41 side of the manifold 49 in the shell 40, the steam of the drain path 52 on the high pressure side carries the moisture (drain) and blows up from the drain opening 59 to the moisture separating element 53 side that is the low pressure side, and this deteriorates the moisture separation performance of the moisture separating element 53.

However, in the present embodiment, the blocking plate 60 is fixed to the lower surface of the lower support frame 56 on the steam inlet 41 side of the manifold 49 in the shell 40, and blocks a part of the drain opening 59. In the present embodiment, the blocking plate 60 serves as the blow-up restraining unit. Accordingly, even when the pressure distribution is generated due to the steam blown out from each of the blowout outlets 50 of the manifold 49 to the shell 40, and on the steam inlet 41 side of the manifold 49 in the shell 40, the steam in the drain path 52 passes the drain opening 59 to blow up to the moisture separating element 53, the blow-up of the steam carrying the moisture is restrained because the opening area of the drain opening 59 is small due to the blocking plate 60, and accordingly the flow resistance is small, and the deterioration of the moisture separation performance of the moisture separating element 53 is restrained.

In the moisture separator 17 according to the first embodiment, the group of the heating tubes 44 are inserted from the one end of the shell 40 in the longitudinal direction; the steam inlet 41 for the low-temperature reheat steam is provided on the other end; the manifold 49 that communicates with the steam inlet 41 is disposed in the shell 40; the blowout outlets 50 for the steam are provided on the side of the manifold 49; the first support plate 51 and the lower support frame 56 are fixed to the lower part in the shell 40 to compart the steam drift space $S_1$ and the drain path 52; the moisture separating element 53 is provided corresponding to the manifold 49; the steam from which the moisture is removed by the moisture separating element 53 is heated by the group of the heating tubes 44 and made into the high-temperature reheat steam to be flown in the steam outlet 42, and the moisture is led from the drain opening 59 through the drain path 52 to the drain outlet 43; and the blocking plate 60 that blocks a part of the drain opening 59 is provided.

Accordingly, the moisture is separated when steam containing the moisture introduced from the blowout outlet 50 of the manifold 49 into the shell 40 passes the moisture separating element 53. The steam from which the moisture is separated and then heated is discharged from the steam outlet 42, and the moisture flows down from the drain opening 59 to the drain path 52, and is discharged from the drain outlet 43. At this time, even when the pressure distribution of the steam is generated in the steam drift space $S_1$ of the shell 40, and a pressure difference is generated between the pressures of the steam drift space $S_1$ and the drain path 52, a part of the drain opening 59 is blocked by the blocking plate 60, the opening area of the drain opening 59 is small, and the flow resistance is large; therefore, a reverse flow of the steam carrying the moisture from the drain path 52 to the moisture separating element 53 can be restrained, and the moisture separation performance can be improved.

In the present embodiment, the blocking plate 60 is fixed to the lower surface of the lower support frame 56 on the steam inlet 41 side of the manifold 49 in the shell 40 to block a part of the drain opening 59. Accordingly, even when the pressure distribution is generated by the steam blown out from each of the blowout outlets 50 of the manifold 49 to the shell 40 due to the downsizing of the diameters of the shell 40 and the manifold 49, and on the steam inlet 41 side of the manifold 49 in the shell 40, the steam in the drain path 52 passes the drain opening 59 to blow up to the moisture separating element 53 side, the blow-up of the steam carrying the moisture can be restrained because a part of the drain opening 59 is blocked by the blocking plate 60, deterioration of the moisture separation performance of the moisture separating element 53 can be restrained, and miniaturization of the apparatus becomes possible.

In addition, the drain opening 59 is formed on the lower support frame 56 (first dividing wall) as a drain flow path that flows the moisture separated by the moisture separating element 53 to the drain path 52, and the blocking plate 60 configuring the throttle unit is provided as the blow-up restraining unit. Accordingly, the blow-up of the steam containing the moisture can be restrained easily with a simple configuration.

The shell 40 has a horizontally placed cylindrical shape, and the two manifolds 49 are disposed therein. The two moisture separating elements 53 are disposed corresponding to the manifolds 49, and the group of the heating tubes 44 are disposed above each of the manifolds 49 in the shell 40. When the low-temperature reheat steam blown out from the blowout outlet 50 of each of the manifolds 49 passes through each of the moisture separating element 53, the moisture is separated. After heating the steam from which the moisture is removed, the steam is flown to the steam outlet 42, and the moisture is led from the drain opening 59 through the drain path 52 to the drain outlet 43. Accordingly, the moisture can be properly separated by flowing the steam in the shell 40. Because the steam from which the moisture is separated is discharged after being heated, efficient use of the steam is possible.

Second Embodiment

Figure 6:
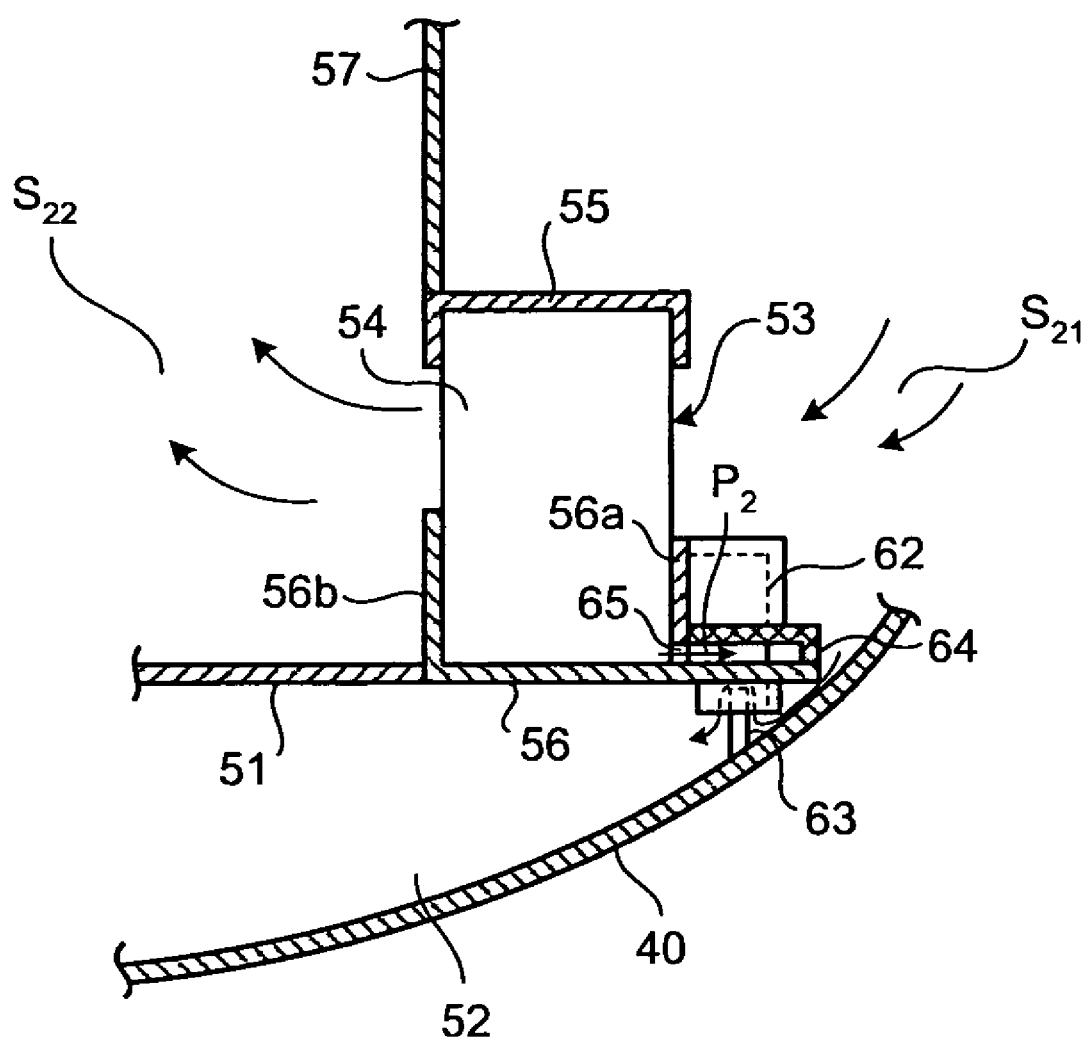
FIG. 6 is a sectional diagram for showing main parts of a moisture separator according to a second embodiment of the present invention.

FIG. 6 is a sectional diagram for showing main parts of a moisture separator according to a second embodiment of the present invention. The overall configuration of the moisture separator according to the present embodiment is almost the same as that of the first embodiment. Thus, it is explained with reference to FIGS. 2 to 4, the same reference numerals are given to the members having the same functions, and the overlapping explanation is omitted.

In the moisture separator 17 according to the second embodiment, as shown in FIGS. 2 to 4, one end of the shell 40 has the steam inlet 41; an upper part of the shell 40 has the steam outlet 42; and a lower part of the shell 40 has the drain outlet 43. The group of the heating tubes 44 is inserted from one end of the shell 40, and the two manifolds 49 are inserted inside the shell 40 below the group of the heating tubes 44. The first support plate 51 and the lower support frame 56 are fixed to the lower part of the shell 40, thereby comparting the steam drift space $S_1$ and the drain path 52. The moisture separating elements 53 are provided corresponding to the blowout outlet 50 of each of the manifolds 49. The second support plate 57 is provided upright to the upper part of the upper support frame 55 in each of the moisture separating elements 53, and the upper support frame 55 and the second support plate 57 compart the steam drift space $S_1$ into the steam supply space $S_{21}$ and the steam discharging space $S_{22}$.

The moisture separating element 53 has the wave-shaped vanes 54 laminated at a predetermined interval, and is supported by the upper and the lower support frames 55,56. The drain opening 59 that communicates the moisture separating element 53 and the drain path 52 is formed on the lower support frame 56 at the leading end side of the manifold 49 opposite to the steam inlet 41 side, and thus the moisture separated by the separator vane 54 can be discharged through the drain opening 59 to the drain path 52.

In the present embodiment, as shown in FIG. 6, a drain opening is not formed on the lower support frame 56 at the moisture separating element 53 positioned in the area A on the steam inlet 41 side of the manifold 49. In the moisture separating element 53 of the area A, a first flow path $P_1$ having an aduncate shape that communicates the steam supply space $S_{21}$ and the drain path 52, and a second flow path $P_2$ that communicates the moisture separating element 53 (steam discharging space $S_{22}$) and the first flow path $P_1$ are provided as drain flow paths.

In other words, in the moisture separating element 53 coupled to the end of the first support plate 51, an upper part dividing plate 62 having a section of an inversed L shape is fixed to the vertical wall 56a on the steam supply space $S_{21}$ side of the lower support frame 56, and a lower part dividing plate 63 is fixed to the inner wall surface of the drain path 52 side in the shell 40. The lower end of the upper part dividing plate 62 comes close to the inner wall surface of the shell 40 with a predetermined gap therebetween, and the upper end of the lower part dividing plate 63 is positioned above the lower end of the upper part dividing plate 62; thereby, the first flow path $P_1$ having an aduncate shape that communicates the steam supply space $S_{21}$ and the drain path 52 is formed. A duct 64 having a box horizontal shape is fixed to the vertical wall 56a of the steam supply space $S_{21}$ side of the lower support frame 56, and a communicating opening 65 is formed on the vertical wall 56a corresponding to the duct 64. The end of the duct 64 is fixed to the upper part dividing plate 62, and thus the second flow path $P_2$ that communicates the moisture separating element 53 and the first flow path $P_1$ is formed. One ends of the first flow path $P_1$ configured by the upper part dividing plate 62 and the lower part dividing plate 63, and the second flow path $P_2$ configured by the duct 64 communicate the flow paths $P_1$, $P_2$ with each other, and the other ends thereof are blocked.

In the thus-configured moisture separator 17 according to the present embodiment, as shown in FIGS. 3 to 6, heating steam is supplied to the group of the heating tubes 44, and circulated in the shell 40, while low-temperature reheat steam is supplied into each of the manifolds 49, and is blown out from a number of the blowout outlet 50 to the steam supply space $S_{21}$ of the shell 40. Then, the steam blown out to the steam supply space $S_{21}$ is directed to each of the moisture separating elements 53 along the inner wall surface of the shell 40, and passes between the separator vanes 54; thereby, the moisture contained in the steam is separated as drain.

The steam from which the moisture is separated by the moisture separating element 53 rises through the steam discharging space $S_{22}$ comparted by the right and left second support plate 57, is heated when passing between the heating tubes 46, and is discharged from the steam outlet 42 as the high-temperature reheat steam. The moisture (drain) separated from the steam by the moisture separating element 53 flows down through the drain opening 59 to the drain path 52, and is discharged from the drain outlet 43 to the outside.

Because the moisture separating element 53 positioned on the steam inlet 41 side of the manifold 49 does not have the drain opening 59, the moisture passes the second flow path $P_2$ and the first flow path $P_1$, flows down to the drain path 52, and is discharged from the drain outlet 43 to the outside. In other words, the moisture (drain) separated from the steam by the moisture separating element 53 positioned on the steam inlet 41 side of the manifold 49 flows down from the communicating opening 65 to the second flow path $P_2$ in the duct 64, passes from the second flow path $P_2$ through the first flow path $P_1$ configured by the upper part dividing plate 62 and the lower part dividing plate 63 to flow down to the drain path 52, and is discharged from the drain outlet 43 to the outside.

Accordingly, even when the pressure distribution is generated due to the steam blown out from each of the blowout outlet 50 of the manifold 49 to the shell 40, and on the steam inlet 41 side of the manifold 49 in the shell 40, the steam of the drain path 52 is to blow up to the moisture separating element 53, it is difficult for the steam to pass first flow path $P_1$ and the second flow path $P_2$ to blow up to the moisture separating element 53 side. Thus, the blow-up of the steam carrying the moisture can be blocked, and the deterioration of the moisture separation performance of the moisture separating element 53 can be restrained. The moisture separated from the steam by the moisture separating element 53 passes from the communicating opening 65 through the second flow path $P_2$ and the first flow path $P_1$ to flow down to the drain path 52, and is discharged properly from the drain outlet 43. The low-temperature reheat steam blown out from each of the blowout outlets 50 of the manifold 49 to the steam supply space $S_{21}$ of the shell 40 is directed to the moisture separating element 53 along the inner wall surface of the shell 40, and when the steam collides the inner wall surface of the shell 40, a part of the moisture contained in the steam is separated to become drain, which then flows along the inner wall surface of the shell 40. The drain passes the first flow path $P_1$ configured by the upper part dividing plate 62 and the lower part dividing plate 63 to flow down to the drain path 52, and is discharged from the drain outlet 43 to the outside.

In the moisture separator 17 according to the second embodiment, the first flow path $P_1$ having an aduncate shape that communicates the steam supply space $S_{21}$ and the drain path 52, and the second flow path $P_2$ that communicates the moisture separating element 53 and the first flow path $P_1$ are provided in the moisture separating element 53 provided in the area A on the steam inlet 41 side of the manifold 49.

Accordingly, the moisture is separated when the steam containing the moisture introduced from the blowout outlet 50 of the manifold 49 into the shell 40 passes the moisture separating element 53. The steam from which the moisture is separated and then heated is discharged from the steam outlet 42, and the moisture flows down from the drain opening 59 to the drain path 52, and is discharged from the drain outlet 43. Because the moisture separating element 53 on the steam inlet 41 side of the manifold 49 does not have the drain opening 59, the moisture flows down from the second flow path $P_2$ and the first flow path $P_1$ to the drain path 52, and is discharged from the drain outlet 43. Accordingly, even when the pressure distribution of the steam is generated in the steam drift space $S_1$ of the shell 40, and a pressure difference is generated between the pressures of the steam drift space $S_1$ and the drain path 52, it is possible to restrain a reverse flow of the steam carrying the moisture from the drain path 52 to the moisture separating element 53 side, and to improve the moisture separation performance. Moreover, the separated moisture passes from the communicating opening 65 through the second flow path $P_2$ and the first flow path $P_1$, is discharged to the drain path 52, and is not retained in the moisture separating element 53; therefore, the moisture separation performance is not deteriorated.

Third Embodiment

Figure 7:
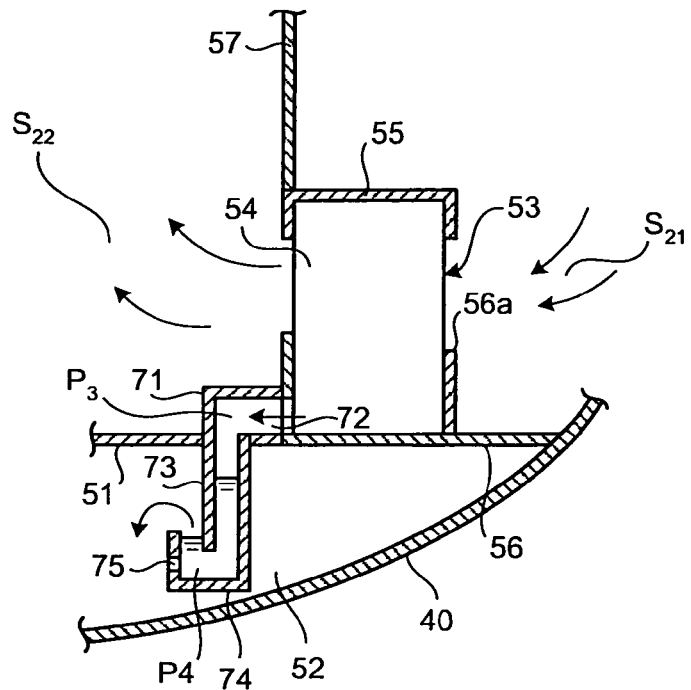
FIG. 7 is a sectional diagram for showing main parts of a moisture separator according to a third embodiment of the present invention.

FIG. 7 is a sectional diagram for showing main parts of a moisture separator according to a third embodiment of the present invention. The overall configuration of the moisture separator according to the present embodiment is almost the same as that of the first embodiment. Thus, it is explained with reference to FIGS. 2 to 4, the same reference numerals are given to the members having the same functions, and the overlapping explanation is omitted.

In the moisture separator 17 according to the third embodiment, as shown in FIGS. 2 to 4, one end of the shell 40 has the steam inlet 41; an upper part of the shell 40 has the steam outlet 42; and a lower part of the shell 40 has the drain outlet 43. The group of the heating tubes 44 is inserted from one end of the shell 40, and the two manifolds 49 are inserted inside the shell 40 below the group of the heating tubes 44. The first support plate 51 and the lower support frame 56 are fixed to the lower part of the shell 40, thereby comparting the steam drift space $S_1$ and the drain path 52. The moisture separating elements 53 are provided corresponding to the blowout outlet 50 of each of the manifolds 49. The second support plate 57 is provided upright to the upper part of the upper support frame 55 in each of the moisture separating elements 53, and the upper support frame 55 and the second support plate 57 compart the steam drift space $S_1$ into the steam supply space $S_{21}$ and the steam discharging space $S_{22}$.

The moisture separating element 53 has the wave-shaped vanes 54 laminated at a predetermined interval, and is supported by the upper and the lower support frames 55, 56. The drain opening 59 that communicates the moisture separating element 53 and the drain path 52 is formed on the lower support frame 56 at the leading end side of the manifold 49 opposite to the steam inlet 41 side, and thus the moisture separated by the separator vane 54 can be discharged through the drain opening 59 to the drain path 52.

In the present embodiment, as shown in FIG. 7, a drain opening is not formed on the lower support frame 56 at the moisture separating element 53 positioned in the area A on the steam inlet 41 side of the manifold 49. In the moisture separating element 53 of the area A, a down flow path $P_3$ that penetrates the first support plate 51 below the moisture separating element 53 (steam discharging space $S_{22}$) and a U-shaped flow path $P_4$ provided at the end on the drain path 52 side in the downflow flow path $P_3$ are provided as drain flow paths.

In other words, in the moisture separating element 53 in the end of the first support plate 51, a header 71 having a box horizontal shape is fixed to the vertical wall 56b on the steam discharging space $S_{22}$ side in the lower support frame 56 above the first support plate 51, and a communicating opening 72 is formed on the vertical wall 56a corresponding to the header 71. A duct 73 that penetrates the first support plate 51 is provided below the header 71. The upper end of the duct 73 communicates with the header 71, and a retaining part 74 that opens upward is formed at the lower end of the duct 73. A gas venting hole 75 is formed at the retaining part 74. The header 71 and the duct 73 configure the downflow flow path $P_3$, and the duct 73 and the retaining part 74 configure U-shaped flow path $P_4$.

The header 71 is intended to ensure a space for retaining gas in the upper part of the box shape, and to ensure a smooth flow of drain. In other words, the header 71 is intended to ensure a gas space that has a uniform pressure in the longitudinal direction of the shell 40 in the header 71 and restrain a reverse flow of drain in the communicating opening 72 by maintaining a sufficient height that ensures a space for retaining gas in the upper part of the box shape, and providing a gas venting hole 78. It is intended to release gas in the retaining part 74 to the gas retention space at the start of the operation, until drain accumulates in the retaining part 74 and to make it easy for the drain to flow in from the communicating opening 72.

When it is not possible to maintain a sufficient height of the header 71, the drain blocks the gas venting hole 78 in the header 71, and the pressure in the header 71 increases so that the flow of drain down in the duct 73 is disturbed. Moreover, this becomes a cause of inhibition of a smooth inflow of drain from the communicating opening 72.

The communicating opening 72 is arranged at a predetermined interval between a pair of the partition walls 47 in the longitudinal direction of the shell 40, and the header 71 is provided in a range where the communicating opening 72 is arranged in the longitudinal direction of the shell 40. The duct 73 needs not be provided over the entire length in the longitudinal direction of the header 71. One header 71 is desirably mounted at a position corresponding to the communicating openings 72. This is because if a wide duct is provided in the longitudinal direction of the shell 40, a fluid gradient is generated in the longitudinal direction in the duct, and a seal height is non-uniform; therefore, the steam carrying the moisture (drain) is more likely to blow up from the drain path 52 side to the header 71 side via the duct 73.

In the thus-configured moisture separator 17 according to the third embodiment, as shown in FIGS. 3 to 7, heating steam is supplied to the group of the heating tubes 44 and circulates in the shell 40, while low-temperature reheat steam is supplied into each of the manifolds 49, and is blown out from a number of the blowout outlet 50 to the steam supply space $S_{21}$ of the shell 40. The steam blown out to the steam supply space $S_{21}$ is directed to each of the moisture separating elements 53 along the inner wall surface of the shell 40, and passes between the separator vanes 54; thereby, the moisture contained in the steam is separated as drain.

The steam from which the moisture is separated by the moisture separating element 53 rises through the steam discharging space $S_{22}$ comparted by the right and left second support plate 57, is heated when passing between the heating tubes 46, and is discharged from the steam outlet 42 as the high-temperature reheat steam. The moisture separated from the steam by the moisture separating element 53 passes the drain opening 59 to flow down to the drain path 52, and is discharged from the drain outlet 43 to the outside.

Because the moisture separating element 53 positioned on the steam inlet 41 side of the manifold 49 does not have the drain opening 59, the moisture passes the downflow flow path $P_3$ and the U-shaped flow path $P_4$ to flow down to the drain path 52, and is discharged from the drain outlet 43 to the outside. In other words, the moisture separated from the steam by the moisture separating element 53 positioned on the steam inlet 41 side of the manifold 49 flows down from the communicating opening 72 to the downflow flow path $P_3$ in the header 71 and the duct 73, is retained temporarily in the retaining part 74 below the downflow flow path $P_3$, then flows down from the opening part of the retaining part 74 to the drain path 52, and is discharged from the drain outlet 43 to the outside. At this time, a loop seal is formed in the U-shaped flow path $P_4$ of the duct 73 and the retaining part 74, and this configures the blow-up restraining unit according to the present embodiment.

Accordingly, a pressure distribution is generated due to the steam blown out from each of the blowout outlet 50 of the manifold 49 to the shell 40. Even when, on the steam inlet 41 side of the manifold 49 in the shell 40, the steam of the drain path 52 is to blow up to the moisture separating element 53 side, it is difficult for the steam to pass the U-shaped flow path $P_4$ and the downflow flow path $P_3$ to blow up to the moisture separating element 53 side, a blow-up of the steam carrying moisture is blocked, and deterioration of the moisture separation performance of the moisture separating element 53 is restrained. The moisture separated from the steam by the moisture separating element 53 passes from the communicating opening 72 to the downflow flow path $P_3$ and the U-shaped flow path $P_4$ to flow down to the drain path 52, and is discharged properly from the drain outlet 43. Because the loop seal is formed in the U-shaped flow path $P_4$, the steam of the drain path 52 is blocked from passing the U-shaped flow path $P_4$ and the downflow flow path $P_3$ to blow up to the moisture separating element 53 side, and deterioration of the moisture separation performance of the moisture separating element 53 is restrained.

In the moisture separator 17 according to the third embodiment, the downflow path $P_3$ that penetrates the first support plate 51 below the moisture separating element 53, and the U-shaped flow path $P_4$ that is provided in the end of the drain path 52 side in the downflow flow path $P_3$ are provided in the moisture separating element 53 in the area A on the steam inlet 41 side of the manifold 49.

Accordingly, the moisture is separated when the steam containing the moisture introduced from the blowout outlet 50 of the manifold 49 into the shell 40 passes the moisture separating element 53. The steam from which the moisture is separated and then heated is discharged from the steam outlet 42, and the moisture flows down from the drain opening 59 to the drain path 52, and is discharged from the drain outlet 43. Because the moisture separating element 53 on the steam inlet 41 side of the manifold 49 does not have the drain opening 59, the moisture flows down from the second flow path $P_2$ and the first flow path $P_1$ to the drain path 52, and is discharged from the drain outlet 43. Accordingly, because the loop seal is formed in the U-shaped flow path $P_4$, even when the pressure distribution of the steam is generated in the steam drift space $S_1$ of the shell 40, and a pressure difference is generated between the pressures of the steam drift space $S_1$ and the drain path 52, a reverse flow of the steam carrying the moisture from the drain path 52 to the moisture separating element 53 side can be restrained, and the moisture separation performance can be improved. The separated moisture passes from the communicating opening 72 through the downflow flow path $P_3$ and the U-shaped flow path $P_4$, and is discharged from the drain path 52; thereby, the moisture is not retained in the moisture separating element 53, and the moisture separation performance is not deteriorated.

The downflow flow path $P_3$ and the U-shaped flow path $P_4$ that discharge the moisture separated by the moisture separating element 53 to the drain path 52 are provided closer to the steam discharging space $S_{22}$ than the moisture separating element 53 is. Accordingly, it is possible to ensure the height of the drain retained in the retaining part 74 by ensuring a sufficient height from the first support plate 51 to the inner wall surface of the shell 40, and it is possible to surely block a reverse flow of the steam passing from the drain path 52 through the U-shaped flow path $P_4$ and the downflow flow path $P_3$ to blow up to the moisture separating element 53 side.

Fourth Embodiment

Figure 8:
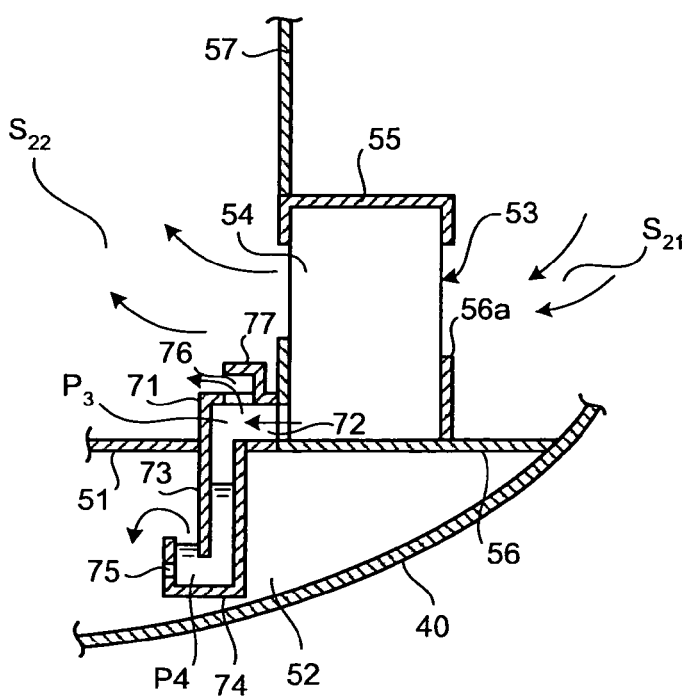
FIG. 8 is a sectional diagram for showing main parts of a moisture separator according to a fourth embodiment of the present invention.
Figure 9:
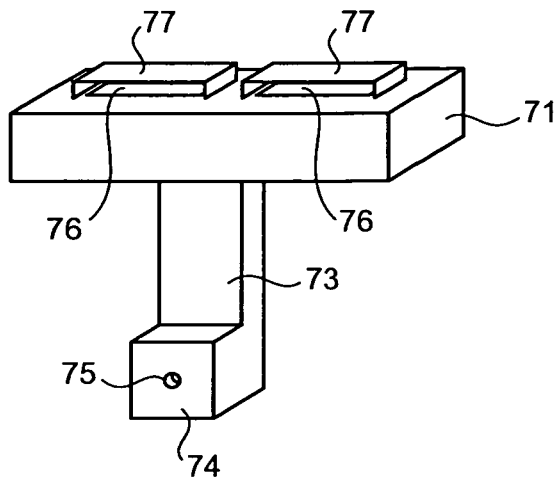
FIG. 9 is a schematic for showing a drain flow path in the moisture separator according to the fourth embodiment.

FIG. 8 is a sectional diagram for showing main parts of a moisture separator according to a fourth embodiment of the present invention. FIG. 9 is a schematic for showing a drain flow path in the moisture separator according to the fourth embodiment. The overall configuration of the moisture separator according to the present embodiment is almost the same as that of the first embodiment. Thus, it is explained with reference to FIGS. 2 to 4, the same reference numerals are given to the members having the same functions, and the overlapping explanation is omitted.

In the fourth embodiment, as shown in FIGS. 8 and 9, the moisture separating element 53 has the wave-shaped vanes 54 laminated at a predetermined interval, and is supported by the upper and the lower support frames 55, 56. The drain opening 59 that communicates the moisture separating element 53 and the drain path 52 is formed on the lower support frame 56 (first dividing wall), and thus the moisture separated by the separator vane 54 can be discharged through the drain opening 59 to the drain path 52.

In the present embodiment, as shown in FIG. 8, a drain opening is not formed on the lower support frame 56 at the moisture separating element 53 positioned in the area A on the steam inlet 41 side of the manifold 49. In the moisture separating element 53 of the area A, the down flow path $P_3$ that penetrates the first support plate 51 below the moisture separating element 53 (steam discharging space $S_{22}$) and a U-shaped flow path $P_4$ provided at the end on the drain path 52 side in the downflow flow path $P_3$ are provided as drain flow paths. The gas venting hole 75 is provided in the end on the steam discharging space $S_{22}$ side in the downflow flow path $P_3$, and a moisture scattering preventing wall 77 is provided above the gas venting hole 76.

In other words, in the moisture separating element 53 at the end of the first support plate 51, the header 71 having a box horizontal shape is fixed to the vertical wall 56b on the steam discharging space $S_{22}$ side of the lower support frame 56 above the first support plate 51, and a communicating opening 72 is formed on the vertical wall 56a corresponding to the header 71. The duct 73 that penetrates the first support plate 51 is provided at the lower part of the header 71. The upper end of the duct 73 communicates with the header 71, and the retaining part 74 that opens upward is formed at the lower end of the duct 73. The header 71 and the duct 73 configure the downflow flow path $P_3$, while the duct 73 and the retaining part 74 configure the U-shaped flow path $P_4$. The gas venting holes 75 that open to the steam discharging space $S_{22}$ is formed on the upper surface of the header 71; thereby, the upper end of the downflow flow path $P_3$ communicates with the steam discharging space $S_{22}$. The moisture scattering preventing wall 77 is formed on the upper surface of the header 71 such that it covers over the gas venting hole 75. The basic principle of the header 71 is the same as that in the third embodiment.

In the thus-configured moisture separator 17 according to the fourth embodiment, moisture is separated from the steam blown out to the steam supply space $S_{21}$ by the moisture separating element 53 to become drain, and the steam passes and rises through the steam discharging space $S_{22}$ comparted by the right and left second support plates 57, and is heated to become high-temperature reheat steam, which is then discharged. The moisture (drain) separated from the steam by the moisture separating element 53, passes the drain opening 59, flows down to the drain path 52, and is discharged from the drain outlet 43 to the outside.

Because there is not the drain opening 59 in the moisture separating element 53 positioned on the steam inlet 41 side of the manifold 49, the moisture passes the downflow flow path $P_3$ and the U-shaped flow path $P_4$, flows down to the drain path 52, and is discharged from the drain outlet 43 to the outside. In other words, the moisture (drain) separated from the steam by the moisture separating element 53 positioned on the steam inlet 41 side of the manifold 49 flows from the communicating opening 72 to the downflow flow path $P_3$ in the header 71 and the duct 73, retained temporarily in the retaining part 74 below the downflow flow path $P_3$, flows down to the drain path 52 from the opening part of the retaining part 74, and is discharged from the drain outlet 43 to the outside. At this time, a loop seal is formed in the U-shaped flow path $P_4$ in the duct 73 and the retaining part 74.

Accordingly, even when a pressure distribution is generated due to the steam blown out from each of the blowout outlets 50 of the manifold 49 to the shell 40, and on the steam inlet 41 side of the manifold 49 in the shell 40, the steam of the drain path 52 is to blow up to the moisture separating element 53 side, it is difficult for the steam to pass the U-shaped flow path $P_4$ and the downflow flow path $P_3$ to blow up to the moisture separating element 53 side; thus, blow-up of the steam carrying the moisture is blocked, and deterioration of the moisture separation performance of the moisture separating element 53 is restrained. In addition, the moisture separated from the steam by the moisture separating element 53 passes from the communicating opening 72 through the downflow flow path $P_3$ and the U-shaped flow path $P_4$ to flow down to the drain path 52, and is discharged properly from the drain outlet 43. Because the loop seal is formed in the U-shaped flow path $P_4$, the steam of the drain path 52 is blocked from passing the U-shaped flow path $P_4$ and the downflow flow path $P_3$ to blow up to the moisture separating element 53 side, and deterioration of the moisture separation performance of the moisture separating element 53 is restrained.

Until the drain accumulates in the retaining part 74, the loop seal may not be formed in the U-shaped flow path $P_4$, and the steam of the drain path 52 may pass the U-shaped flow path $P_4$ and the downflow flow path $P_3$ to blow up to the moisture separating element 53 side. However, in the present embodiment, the gas venting hole 76 and the moisture scattering preventing wall 77 are formed in the header 71 positioned above the downflow flow path $P_3$. Accordingly, even when the steam of the drain path 52 passes and rises through the U-shaped flow path $P_4$ and the downflow flow path $P_3$, the steam collides the moisture scattering preventing wall 77, and this restrains the steam from blowing up to the steam discharging space $S_{22}$. Moreover, by releasing the pressure inside the header 71 by the gas venting hole 76, the pressures in the U-shaped flow path $P_4$ and the downflow flow path $P_3$ can be maintained uniform to each other all the time.

In the moisture separator 17 according to the fourth embodiment, the downflow path $P_3$ that penetrates the first support plate 51 below the moisture separating element 53 and the U-shaped flow path $P_4$ that is provided at the end on the drain path 52 side in the downflow flow path $P_3$ are provided in the moisture separating element 53 provided in the area A on the steam inlet 41 side of the manifold 49, the gas venting hole 76 is provided in the end on the steam discharging space $S_{22}$ side in the downflow flow path $P_3$, and the moisture scattering preventing wall 77 is provided above the gas venting hole 76.

Accordingly, because there is not the drain opening 59 in the moisture separating element 53 on the steam inlet 41 side of the manifold 49, the moisture flows down from the downflow flow path $P_3$ and the U-shaped flow path $P_4$ to the drain path 52, and is discharged from the drain outlet 43. Therefore, even when a pressure distribution of the steam is generated in the steam drift space $S_1$ of the shell 40, and a pressure difference is generated between the pressures of the steam drift space $S_1$ and the drain path 52, because the loop seal is formed in the U-shaped flow path $P_4$, a reverse flow of the steam carrying the moisture from the drain path 52 to the moisture separating element 53 side can be restrained, and the moisture separation performance can be improved. Moreover, before the formation of the loop seal, the steam of the drain path 52 collide the moisture scattering preventing wall 77, and this restrains blow-up of the steam to the steam discharging space $S_{22}$. At this time, by releasing the pressures of the downflow flow path $P_3$ and the U-shaped flow path $P_4$ from the gas venting hole 75 by the gas venting hole 75, the pressures in the U-shaped flow path $P_4$ and the downflow flow path $P_3$ can be maintained uniform to each other all the time.

Fifth Embodiment

Figure 10:
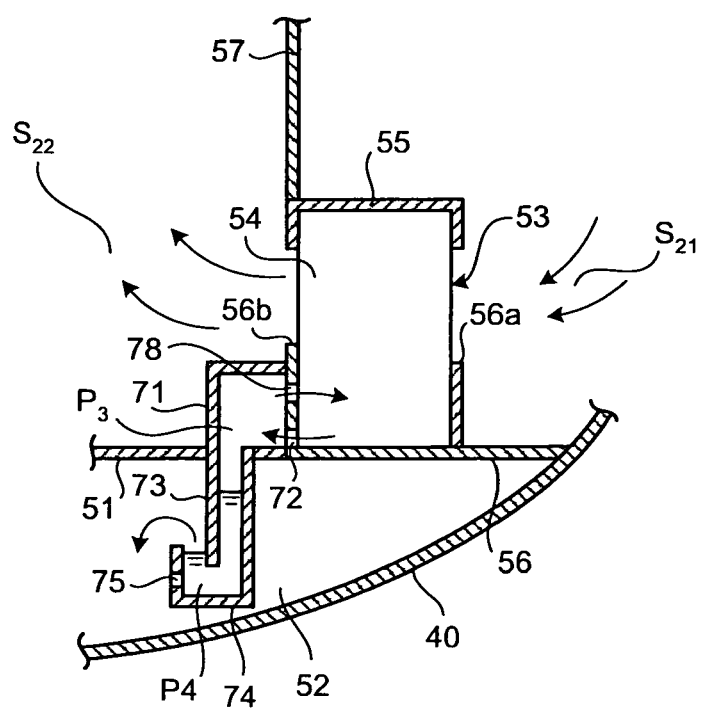
FIG. 10 is a sectional diagram for showing main parts of a moisture separator according to a fifth embodiment of the present invention.

FIG. 10 is a sectional diagram for showing main parts of a moisture separator according to a fifth embodiment of the present invention. The overall configuration of the moisture separator according to the present embodiment is almost the same as that of the first embodiment. Thus, it is explained with reference to FIGS. 2 to 4, the same reference numerals are given to the members having the same functions, and the overlapping explanation is omitted.

In the fifth embodiment, as shown in FIG. 10, the moisture separating element 53 has the wave-shaped vanes 54 laminated at a predetermined interval, and is supported by the upper and the lower support frames 55, 56. The drain opening 59 that communicates the moisture separating element 53 and the drain path 52 is formed on the lower support frame 56 (first support wall), and thus the moisture separated by the separator vane 54 can be discharged through the drain opening 59 to the drain path 52.

In the present embodiment, a drain opening is not formed on the lower support frame 56 at the moisture separating element 53 positioned in the area A on the steam inlet 41 side of the manifold 49. In the moisture separating element 53 of the area A, the down flow path $P_3$ that penetrates the first support plate 51 below the moisture separating element 53 (steam discharging space $S_{22}$) and the U-shaped flow path $P_4$ provided at the end on the drain path 52 side in the downflow flow path $P_3$ are provided as drain flow paths. The gas venting hole 78 that penetrates the moisture separating element 53 is provided in the end on the steam discharging space $S_{22}$ side in the downflow flow path $P_3$.

In other words, in the moisture separating element 53 in the end of the first support plate 51, the header 71 having a box horizontal shape is fixed to the vertical wall 56b on the steam discharging space $S_{22}$ side of the lower support frame 56 above the first support plate 51, and the communicating opening 72 is formed on the vertical wall 56a corresponding to the header 71. The duct 73 that penetrates the first support plate 51 is provided in the lower part of the header 71. The upper end of the duct 73 communicates with the header 71, and the retaining part 74 that opens upward is formed in the lower end of the duct 73. The header 71 and the duct 73 configure the downflow flow path $P_3$, and the duct 73 and the retaining part 74 configure the U-shaped flow path $P_4$. Because the gas venting hole 78 is formed in the vertical wall 56b corresponding to the header 71, the gas venting hole 78 being positioned above the communicating opening 72, the upper part of the downflow flow path $P_3$ communicates with the moisture separating element 53. The basic principle of the header 71 is the same as that in the third embodiment.

In the thus-configured moisture separator 17 according to the fifth embodiment, moisture is separated from the steam blown out to the steam supply space $S_{21}$ by the moisture separating element 53 to become drain, and the steam passes and rises through the steam discharging space $S_{22}$ comparted by the right and left second support plates 57, and is heated to become high-temperature reheat steam, which is then discharged. The moisture (drain) separated from the steam by the moisture separating element 53, passes the drain opening 59, flows down to the drain path 52, and is discharged from the drain outlet 43 to the outside.

Because there is not the drain opening 59 in the moisture separating element 53 positioned on the steam inlet 41 side of the manifold 49, the moisture passes the downflow flow path $P_3$ and the U-shaped flow path $P_4$, flows down to the drain path 52, and is discharged from the drain outlet 43 to the outside. In other words, the moisture (drain) separated from the steam by the moisture separating element 53 positioned on the steam inlet 41 side of the manifold 49 flows from the communicating opening 72 to the downflow flow path $P_3$ in the header 71 and the duct 73, retained temporarily in the retaining part 74 below the downflow flow path $P_3$, flows down to the drain path 52 from the opening part of the retaining part 74, and is discharged from the drain outlet 43 to the outside. At this time, a loop seal is formed in the U-shaped flow path $P_4$ in the duct 73 and the retaining part 74, and thus a blow-up restraining unit according to the present invention is configured.

Accordingly, even when a pressure distribution is generated due to the steam blown out from each of the blowout outlets 50 of the manifold 49 to the shell 40, and on the steam inlet 41 side of the manifold 49 in the shell 40, the steam of the drain path 52 is to blow up to the moisture separating element 53 side, it is difficult for the steam to pass the U-shaped flow path $P_4$ and the downflow flow path $P_3$ to blow up to the moisture separating element 53 side; thus, blow-up of the steam carrying the moisture is blocked, and deterioration of the moisture separation performance of the moisture separating element 53 is restrained. In addition, the moisture separated from the steam by the moisture separating element 53 passes from the communicating opening 72 through the downflow flow path $P_3$ and the U-shaped flow path $P_4$ to flow down to the drain path 52, and is discharged properly from the drain outlet 43. Because the loop seal is formed in the U-shaped flow path $P_4$, the steam of the drain path 52 is blocked from passing the U-shaped flow path $P_4$ and the downflow flow path $P_3$ to blow up to the moisture separating element 53 side, and deterioration of the moisture separation performance of the moisture separating element 53 is restrained.

Until the drain accumulates in the retaining part 74, the loop seal cannot be formed in the U-shaped flow path $P_4$, and the steam of the drain path 52 may pass the U-shaped flow path $P_4$ and the downflow flow path $P_3$ to blow up to the moisture separating element 53 side. However, in the present embodiment, the gas venting hole 78 that communicates with the moisture separating element 53 is formed in the header 71 positioned above the downflow flow path $P_3$. Accordingly, even when the steam of the drain path 52 passes and rises through the U-shaped flow path $P_4$ and the downflow flow path $P_3$, the steam is supplied to the moisture separating element 53, and the moisture is separated again. Moreover, by releasing the pressure inside the header 71 by the gas venting hole 76, the pressures in the U-shaped flow path $P_4$ and the downflow flow path $P_3$ can be maintained uniform to each other all the time.

In the moisture separator 17 according to the fifth embodiment, the downflow flow path $P_3$ that penetrates the first support plate 51 below the moisture separating element 53 and the U-shaped flow path $P_4$ that is provided at the end on the drain path 52 side in the downflow flow path $P_3$ are provided in the moisture separating element 53 provided in the area A on the steam inlet 41 side of the manifold 49, and the gas venting hole 78 that communicates with the moisture separating element 53 is provided above the downflow flow path $P_3$.

Accordingly, because there is not the drain opening 59 in the moisture separating element 53 on the steam inlet 41 side of the manifold 49, the moisture flows down from the downflow flow path $P_3$ and the U-shaped flow path $P_4$ to the drain path 52, and is discharged from the drain outlet 43. Therefore, even when a pressure distribution of the steam is generated in the steam drift space $S_1$ of the shell 40, and a pressure difference is generated between the pressures of the steam drift space $S_1$ and the drain path 52, because the loop seal is formed in the U-shaped flow path $P_4$, a reverse flow of the steam carrying the moisture from the drain path 52 to the moisture separating element 53 side can be restrained, and the moisture separation performance can be improved. Moreover, before the formation of the loop seal, the steam of the drain path 52 passes the U-shaped flow path $P_4$ and the downflow flow path $P_3$ to return from the gas venting hole 78 to the moisture separating element 53, and thus the moisture can be separated again from the steam. At this time, by releasing also the pressures of the downflow flow path $P_3$ and the U-shaped flow path $P_4$, the pressures in the U-shaped flow path $P_4$ and the downflow flow path $P_3$ can be maintained uniform to each other all the time.

Sixth Embodiment

Figure 11:
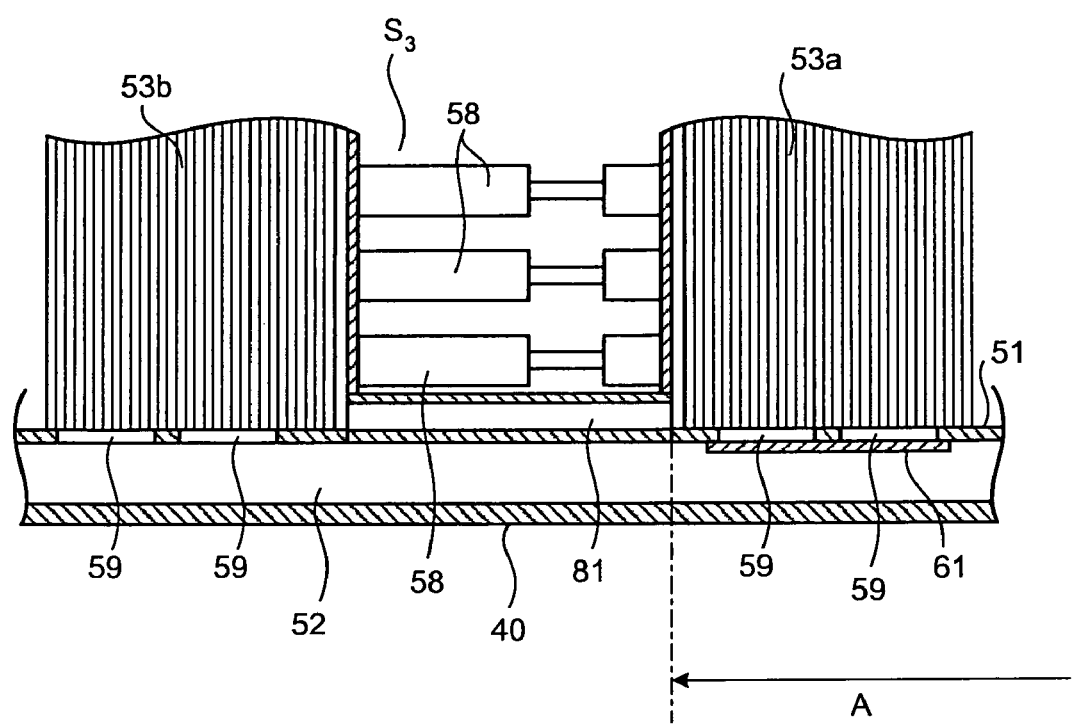
FIG. 11 is a sectional diagram for showing main parts of a moisture separator according to a sixth embodiment of the present invention.

FIG. 11 is a sectional diagram for showing main parts of a moisture separator according to a sixth embodiment of the present invention. The overall configuration of the moisture separator according to the present embodiment is almost the same as that of the first embodiment. Thus, it is explained with reference to FIGS. 2 to 4, the same reference numerals are given to the members having the same functions, and the overlapping explanation is omitted.

In the sixth embodiment, as shown in FIG. 11, the moisture separating elements 53 are disposed on the first support plate 51 of the shell 40 in the longitudinal direction, are divided into the moisture separating element 53a positioned on the steam inlet 41 side of the manifold 49, and the moisture separating element 53b positioned on the leading end side of the manifold 49 by a maintenance space $S_3$. The moisture separating elements 53a, 53b are respectively supported by intervening the plurality of jack bolts 58 between them. The drain openings 59 that communicate with the drain path 52 are formed on the first support plate 51 positioned below the moisture separating elements 53, and moisture separated from steam can be discharged through the drain openings 59 to the drain path 52.

By fixing a blocking plate 61 as a blow-up restraining unit to the lower surface of the first support plate 51 of the moisture separating element 53a positioned on the steam inlet 41 side of the manifold 49, the drain opening 59 is blocked. The blocking plate 61 is not fixed for the moisture separating element 53b positioned on the leading end side of the manifold 49, and the drain opening 59 is left open. By fixing a duct 81 to the lower part of the maintenance space $S_3$ as a bypass flow path, the lower ends of the divided moisture separating elements 53a, 53b are communicated with each other, and the moisture separated by the moisture separating element 53a can be flown through the duct 81 to the moisture separating element 53b, and discharged from the open drain opening 59 to the drain path 52.

In the thus-configured moisture separator 17 according to the sixth embodiment, moisture is separated from the steam blown out to the steam supply space $S_{21}$ by the moisture separating element 53 to become drain, and the steam passes and rises through the steam discharging space $S_{22}$ comparted by the right and left second support plates 57, and is heated to become high-temperature reheat steam, which is then discharged. The moisture (drain) separated from the steam by the moisture separating element 53 passes the drain opening 59, and flows down to the drain path 52 to be discharged from the drain outlet 43 to the outside.

Because the drain opening 59 positioned on the steam inlet 41 side of the manifold 49 is blocked by the blocking plate 61 fixed thereto, the moisture separated by the moisture separating element 53a flows on the first support plate 51, passes the duct 81, flows to the moisture separating element 53b, and is discharged from the open drain opening 59 to the drain path 52. Accordingly, even when a pressure distribution is generated due to the steam blown out from each of the blowout outlet 50 of the manifold 49 to the shell 40, in the steam inlet 41 side of the manifold 49 in the shell 40, and the steam of the drain path 52 passes the drain opening 59 to blow up to the moisture separating element 53 side, blow-up of the steam carrying the moisture is blocked because the drain opening 59 positioned on the steam inlet 41 side of the manifold 49 is blocked by the blocking plate 61, and deterioration of the moisture separation performance of the moisture separating element 53 is restrained.

In the moisture separator 17 according to the sixth embodiment, the moisture separating element 53a positioned on the steam inlet 41 side of the manifold 49, and the moisture separating element 53b positioned on the leading end side of the manifold 49 are divided by the maintenance space $S_3$, the drain opening 59 that penetrates to the drain path 52 is formed on the first support plate 51 of the moisture separating elements 53a, 53b, the drain opening of the moisture separating element 53a positioned on the steam inlet 41 side of the manifold 49 is blocked by the blocking plate 61, and the lower ends of the divided moisture separating elements 53a, 53b, are communicated to each other by the duct 81.

Accordingly, because the drain opening 59 is blocked in the moisture separating element 53a on the steam inlet 41 side of the manifold 49, the moisture moves through the duct 81 to the moisture separating element 53b, and is discharged from the open drain opening 59 to the drain path 52. Accordingly, even when the pressure distribution of the steam is generated in the steam drift space $S_1$ of the shell 40, and a pressure difference is generated between the pressures of the steam drift space $S_1$ and the drain path 52, a reverse flow of the steam carrying the moisture from the drain path 52 to the moisture separating element 53 can be restrained because the drain opening 59 is blocked by the blocking plate 61, and the moisture separation performance can be improved. Moreover, the moisture separated by the moisture separating element 53a is discharged from the drain opening 59 on the moisture separating element 53b side to the drain path 52, and is not retained in the moisture separating element 53; therefore, the moisture separation performance is not deteriorated.

Seventh Embodiment

Figure 12:
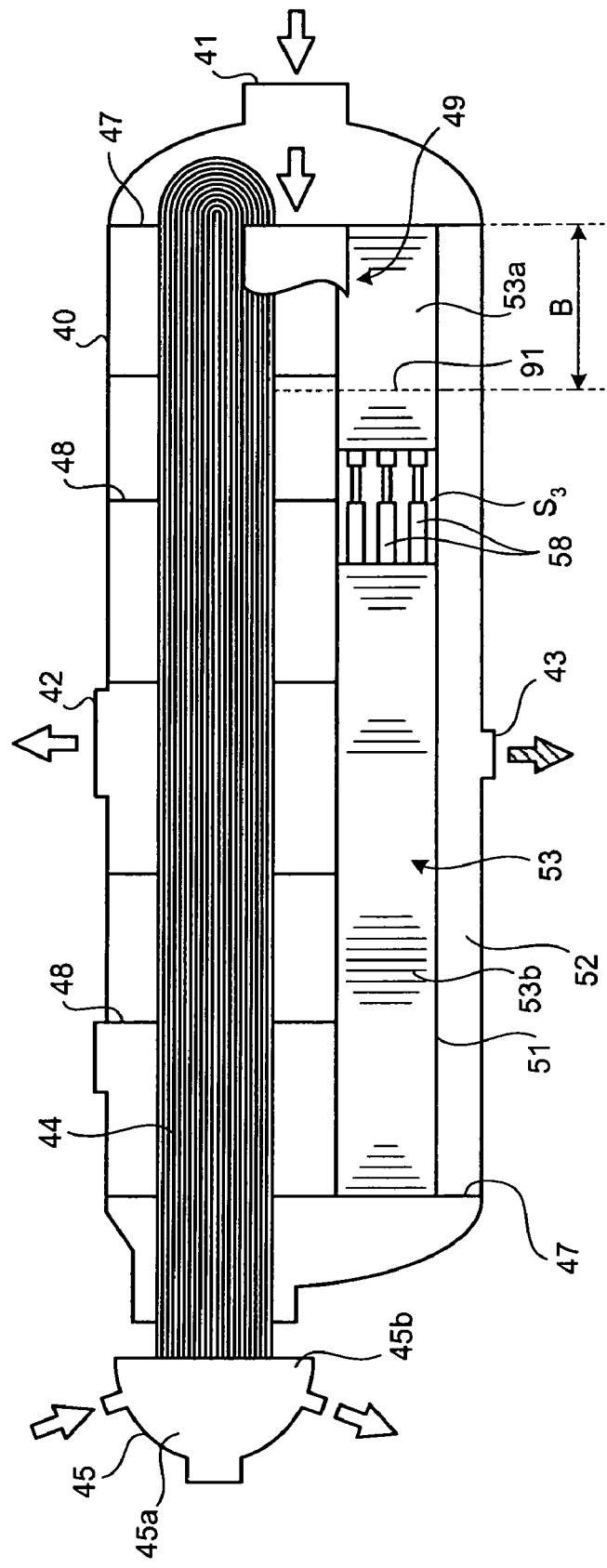
FIG. 12 is a schematic for showing a moisture separator according to a seventh embodiment of the present invention.
Figure 13:
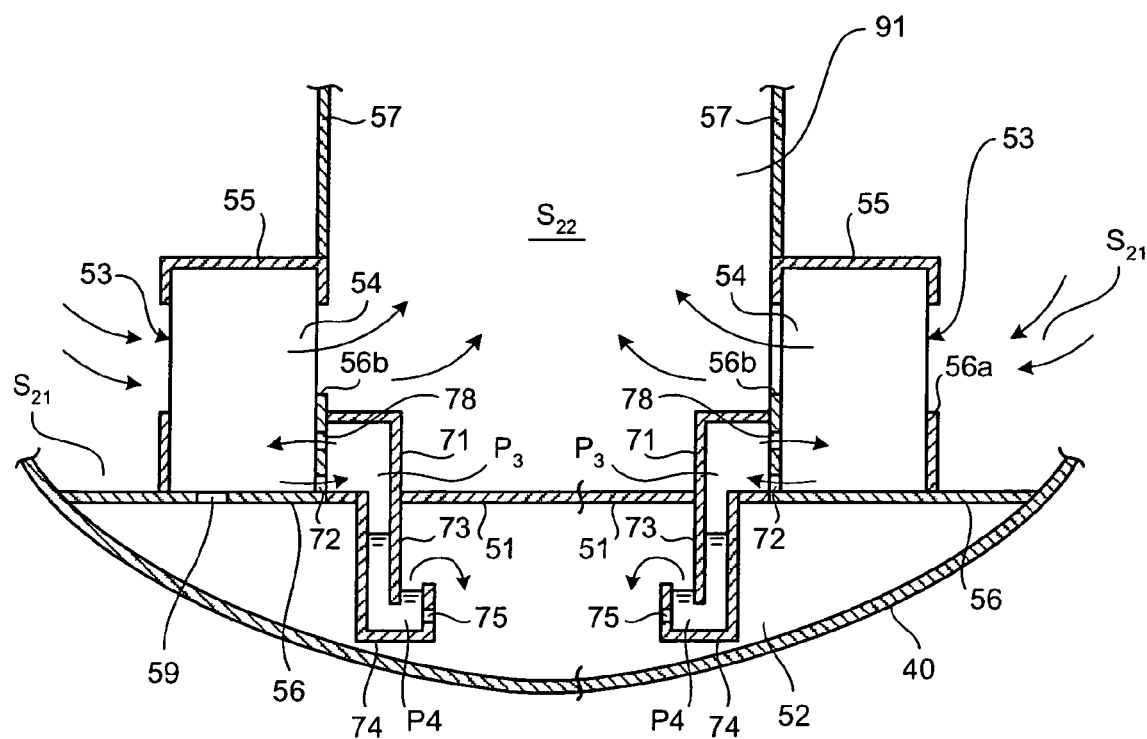
FIG. 13 is a sectional diagram for showing main parts of a moisture separator according to the seventh embodiment.
Figure 14:
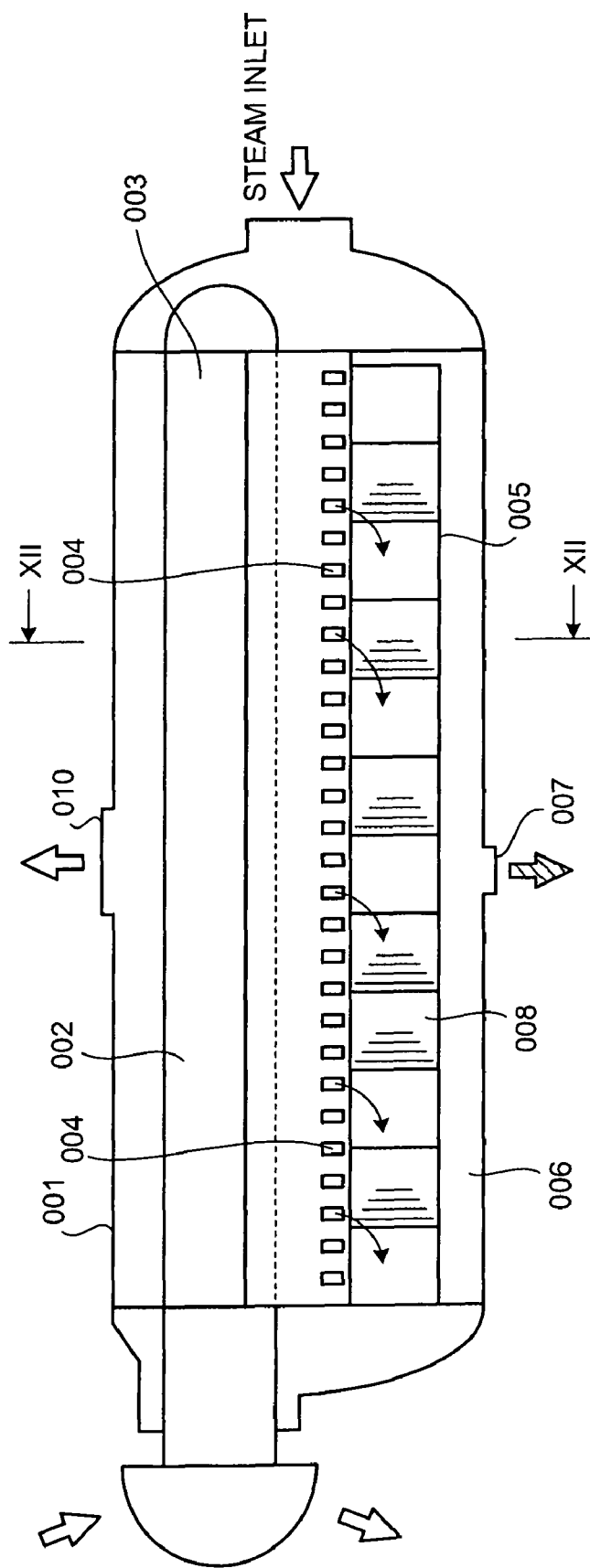
FIG. 14 is a schematic for showing a conventional moisture separator.
Figure 15:
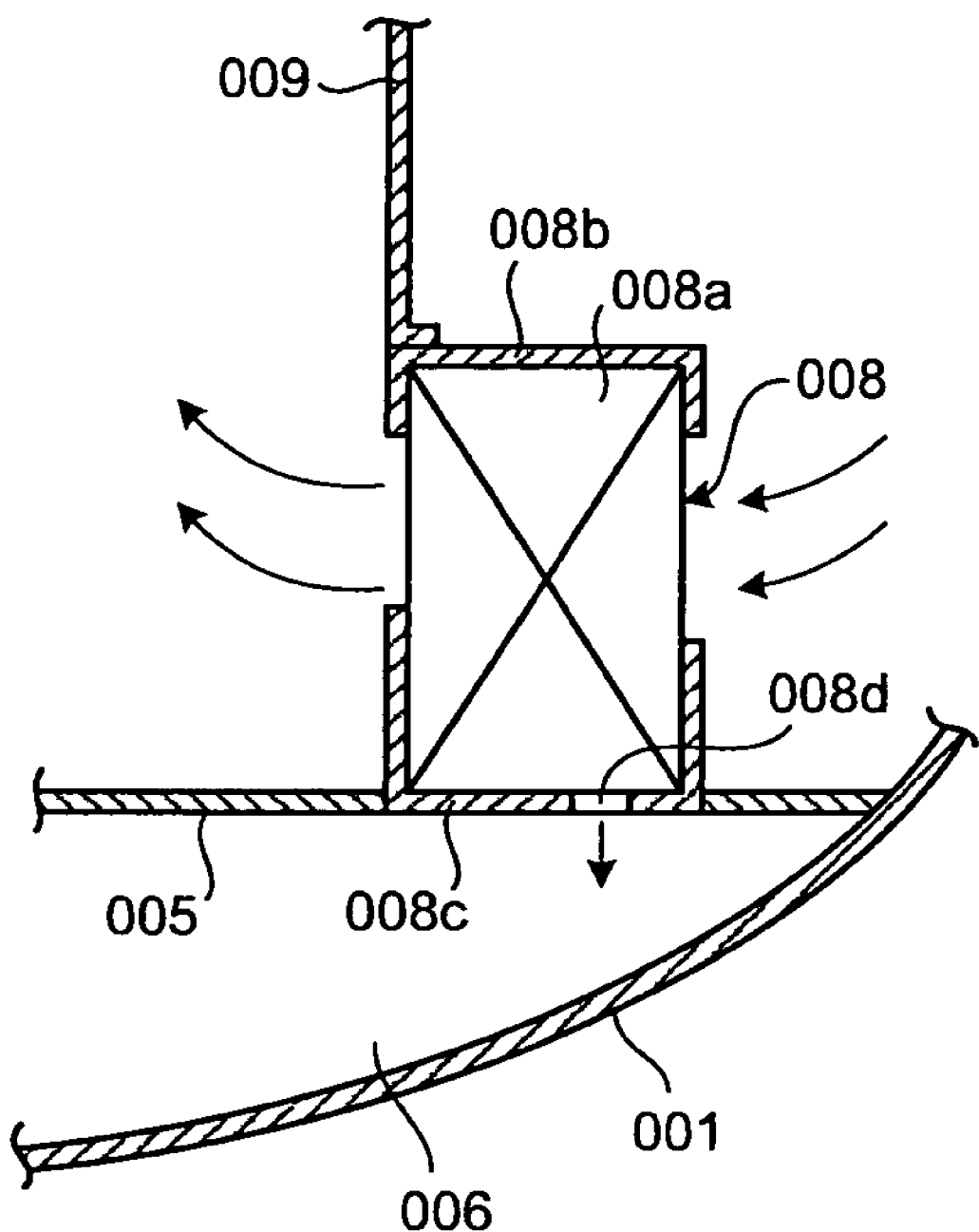
FIG. 15 is a sectional diagram for showing main parts of the conventional moisture separator.

FIG. 12 is a schematic for showing a moisture separator according to a seventh embodiment of the present invention. FIG. 13 is a sectional diagram for showing main parts of the moisture separator according to the seventh embodiment. The overall configuration of the moisture separator according to the present embodiment is almost the same as that of the first embodiment. Thus, it is explained with reference to FIGS. 2 to 4, the same reference numerals are given to the members having the same functions, and the overlapping explanation is omitted.

In the seventh embodiment, to prevent a phenomenon that low-temperature reheat steam flows reversely from the steam discharging space $S_{22}$ side to the steam supply space $S_{21}$, an intermediate partition wall is provided in the steam discharging space $S_{22}$. In other words, the intermediate partition wall is provided near the steam inlet of the shell to compart the steam drift space into a space of the steam inlet side, and a space of the far side, and the blow-up restraining unit is provided in the space of the steam inlet side.

Specifically, in the seventh embodiment as shown in FIGS. 2 to 4, the diameters of the shell 40 and the manifold 49 are downsized in the moisture separator 17 for the downsizing of the apparatus. Accordingly, the flow speed of the steam flowing in the manifold 49 increases, the steam blown out from each of the blowout outlets 50 collides the partition wall 47 on the leading end side of the manifold 49, that is, the steam chamber 45 side (left side in FIG. 2) to recover the static pressure, and the pressure distribution is generated in the longitudinal direction of the shell 40. Accordingly, in the steam supply space side $S_{21}$, the pressure of the leading end side (steam chamber 45 side) of the manifold 49 in which a larger amount of the steam flows is higher than the pressure on the steam inlet 41 side of the manifold 49 in the longitudinal direction of the shell 40.

Due to the influence of the pressure distribution in the longitudinal direction of the shell 40, in the steam discharging space $S_{22}$ also, the pressure on the steam inlet 41 side is low, and the pressure on the leading end side (steam chamber 45 side) of the manifold 49 is high. Accordingly, a part of the low-temperature regeneration steam having passed from the steam supply space $S_{21}$ through the moisture separating element 53 and flown into the steam discharging space $S_{22}$ flows in the steam discharging space $S_{22}$ from the leading end side (steam chamber 4 side) of the manifold 49 to the steam inlet 41 side in the longitudinal direction, and a phenomenon is generated in which the steam flows reversely through the moisture separating element 53 to the steam supply space $S_{21}$ side near the steam inlet 41 side. The reverse flow phenomenon deteriorates the efficiency of the moisture separator, and therefore the reverse flow needs to be prevented. Accordingly, as shown in FIGS. 12 and 13, an intermediate partition wall 91 is provided upright in the steam discharging space $S_{22}$, and the steam is prevented from flowing in the steam discharging space $S_{22}$ from the leading end side (steam chamber 45 side) of the manifold 49 to the steam inlet 41 side in the longitudinal direction. The condition is the same as that of the other embodiments, in which the generation of the pressure distribution in the shell 40 increases the pressure in the drain path 52.

As shown in FIG. 12, the intermediate partition wall 91 is provided at a single position in the steam discharging space $S_{22}$ sandwiched by the pair of the partition walls 47 provided in the shell 40. The intermediate partition wall 91 forms a surface vertical to the longitudinal direction of the shell 40. In the cross-sectional view of the shell 40, the intermediate partition wall 91 covers an entire surface of the steam discharging space $S_{22}$ enclosed by the first support plate 51, the second support plate 57, and the group of the heating tubes 44.

Describing sectional structure of main paths of the present embodiment in detail, as shown in FIG. 13, in the steam discharging space $S_{22}$ enclosed by the intermediate partition wall 91 and the partition wall 47 on the steam inlet 41 side (the range indicated by B in FIG. 12, the right section in FIG. 13), the structure is the same as that in the fifth embodiment, and in the steam discharging space $S_{22}$ (right section in FIG. 13) enclosed by the intermediate partition wall 91 and the other partition wall 47 provided on the leading end side (steam chamber 45 side) of the manifold 49, the structure is the same as that in the conventional art.

In other words, in the steam discharging space $S_{22}$ enclosed by the intermediate partition wall 91 and the partition wall 47 on the steam inlet 41 side as shown in FIGS. 12 and 13, the header 71 having a box horizontal shape is fixed on the first support plate 51 by the vertical wall 56b on the steam discharging space $S_{22}$ side in the lower support frame 56. The communicating opening 72 is formed on the vertical wall 56b corresponding to the header 71. The duct 73 that penetrate the first support plate 51 is provided below the header 71, and the upper end of the duct 73 communicates with the header 71. The retaining part 74 that opens upward is formed at the lower end of the duct 73. The downflow flow path $P_3$ is configured by the header 71 and the duct 73, and the U-shaped path $P_4$ is configured by the duct 73 and the retaining part 74. The gas venting hole 78 positioned above the communicating opening 72 is formed on the vertical wall 56b corresponding to the header 71, and accordingly the upper end of the downflow flow path $P_3$ communicates with the moisture separating element 53. The basic principle of the header 71 is the same as that of the third embodiment.

On the other hand, in the steam discharging space $S_{22}$ enclosed by the intermediate partition wall 91 and the other partition wall 47 provided on the leading end side (steam chamber 45 side) of the manifold 49, merely the drain opening 59 is provided to the lower support frame 56, but the header 71, and the duct 73 are not provided, and the blocking plate 60 explained in the first embodiment is not provided.

This configuration is employed because the phenomenon of inverse pressures of the drain path 52 side and the steam discharging space $S_{22}$ side are noticeable in the steam discharging space $S_{22}$ enclosed by the intermediate partition wall 91 and the partition wall 47 on the steam inlet 41 side, and the steam carrying the moisture (drain) from the drain path 52 blows up hard.

In the present embodiment, the loop seal is formed by the U-shaped flow path $P_4$ in the duct 73 and the retaining part 74, and thus the blow-up restraining unit of the present embodiment is configured. Accordingly, even when the steam in the drain path 52 is to blow up to the moisture separating element 53 side, it is difficult for the steam to pass the U-shaped flow path $P_4$ and the downflow flow path $P_3$ to the moisture separating element 53 side, the blow-up of the steam carrying the moisture (drain) is blocked, and the deterioration of the moisture separation performance of the moisture separating element 53 is restrained.

In the present embodiment, the structure of main parts in the steam discharging space $S_{22}$ enclosed by the intermediate partition wall 91 and the partition wall 47 on the steam inlet 41 side is the same as that explained in the fifth embodiment; however, any one of the structures explained in the first to fourth embodiment may be employed. In the steam discharging space $S_{22}$ enclosed by the intermediate partition wall 91 and the other partition wall 47 provided on the leading end side (steam chamber side) of the manifold 49, the steam carrying the moisture (drain) does not blow up from the drain path 52, and the blow-up restraining unit needs not be provided. The basic principle of the flow of the steam and the moisture (drain) in the shell 40 is the same as that in the fifth embodiment.

In the moisture separator according to the seventh embodiment, the intermediate partition wall 91 that comparts the steam discharging space $S_{22}$ into the space on the steam inlet 41 side and the space on the leading end side (steam chamber 45 side) is provided near the steam inlet 41, and the U-shaped flow path $P_4$ as the blow-up restraining unit is provided in the space on the steam inlet 41 side. Accordingly, the blow-up of the moisture that is likely to be generated in the space on the steam inlet 41 side can be surely restrained.

In each of the embodiments, the first dividing wall is configured by the first support plate 51 and the lower support frame 56, the moisture separating element 53 is coupled to the first support plate 51, and the drain opening 59 as the drain flow path is formed on the lower support frame 56. However, the drain opening 59 may be formed on the first support plate 51 according to the support structure of the moisture separating element 53 to the first support plate 51. In each of the embodiments, the blow-up restraining unit of the present invention is provided to the moisture separating element 53 positioned in the area A on the steam inlet 41 side of the manifold 49. However, the drain opening 59 may be eliminated, and the blow-up restraining unit of the present invention may be provided in all the areas provided with the moisture separating elements 53.

In each of the embodiments, the moisture separator of the present invention is explained as a moisture separator; however, it may be a moisture separator not having the group of the heating tubes 44 in the shell 40. Furthermore in the moisture separator of the present invention according to each of the embodiments, the two manifolds 49 are inserted through one end of the shell 40, the steam inlet 41 for the steam is formed on the base end of the manifold 49, and the blowout outlet 50 is formed on the side. However, it is not limited to this configuration. For example, a steam inlet for the steam may be formed on the lower part of the shell at the middle position in the longitudinal direction, and the moisture separating element may be disposed on an upper part thereof. In this case also, it is assumed that when the diameter of the shell is downsized, the flow speed of the steam flowing in the shell increases, the steam collides the partition surface on the far side of the shell to recover the static pressure; therefore, the pressure distribution is generated between the near side of the steam inlet for the steam and the far side, and the steam in the drain path carries the moisture (drain) and blows up to the moisture separating element side. The present invention is thus effective.

Industrial Applicability

The moisture separator according to the present invention is intended to restrain the reverse flow of the moisture from the drain path to the moisture separating element side, and to improve the moisture separation performance, and can be applied to various types of moisture separators.

The invention claimed is:

1. A moisture separator comprising:
a shell having a hollow shape;
a steam inlet for introducing steam containing moisture into the shell;
a moisture separating element that is provided in the shell, and separates the moisture contained in the steam that is supplied from the steam inlet and passes the moisture separating element;
a steam outlet for discharging the steam after the moisture is extracted in the moisture separating element, the steam outlet being provided on an upper part of the shell;
a drain outlet for discharging the moisture separated from the steam in the moisture separating element, the drain outlet being provided on a lower part of the shell;
a first dividing wall for dividing a steam drift space from a drain path, the steam drift space causing the steam introduced from the steam inlet to pass the moisture separating element and to flow to the steam outlet, and the drain path leading the moisture separated in the moisture separating element to the drain outlet;
a drain flow path for communicating between the steam drift space and the drain path to flow the moisture separated in the moisture separating element to the drain path; and
a blow-up restraining unit for restraining the moisture of the drain path from reversing back through the drain flow path and from blowing up to a side of the steam drift space.

2. The moisture separator according to claim 1, wherein the blow-up restraining unit is provided to the drain flow path positioned near the steam inlet.

3. The moisture separator according to claim 1, wherein the drain flow path is a drain opening formed on the first dividing wall below the moisture separating element, and the blow-up restraining unit is a throttle unit provided to the drain opening.

4. The moisture separator according to claim 1, further comprising a second dividing wall, wherein
the second dividing wall and the moisture separating element divide the stream drift space into a steam supply space in which the steam introduced from the steam inlet flows to the moisture separating element, and a steam discharging space in which the steam from which the moisture has been separated by the moisture separating element flows to the steam outlet, and
the drain flow path has a first flow path having an aduncate shape that communicates between the steam supply space and the drain path, and a second flow path that communicates between the steam discharging space and the first flow path.

5. The moisture separator according to claim 1, wherein the drain flow path has a downflow flow path that penetrates the first dividing wall below the moisture separating element, and a U-shaped flow path that is provided to an end of the downflow flow path on a drain path side.

6. The moisture separator according to claim 5, further comprising a moisture scattering preventing wall, wherein
an end of the downflow flow path has a gas venting hole on a steam discharging space side, and
the moisture scattering preventing wall is provided above the gas venting hole.

7. The moisture separator according to claim 5, wherein an end of the downflow flow path has a gas venting hole that penetrates the moisture separating element on a steam discharging space side.

8. The moisture separator according to claim 1, wherein
the moisture separating element has at least two portions divided by a maintenance space, one of the portions being on a steam inlet side and another of the portions being on a far side, and
the drain flow path has a drain opening formed on the first dividing wall below the other portion of the moisture separating element provided at the far side, and a bypass flow path that communicates between the portions of the moisture separating element.

9. The moisture separator according to claim 1, further comprising an intermediate partition wall that divides the steam drift space into a space on a steam inlet side and a space on a far side is provided near the steam inlet, and the blow-up restraining unit is provided in the space on the steam inlet side.

10. The moisture separator according to claim 1, further comprising two manifolds that communicate with the steam inlet inserted inside the shell, wherein
the shell has a horizontally placed cylindrical shape,
the steam inlet is formed at one end of the shell in a longitudinal direction thereof,
sides of the manifolds have a plurality of blowout outlets for blowing out the steam into the shell,
the first dividing wall is fixed to a lower part in the shell to divide the steam drift space from the drain path,
the moisture separating element includes at least two moisture separating elements that are provided on the first dividing wall corresponding to the two manifolds,
the moisture contained in the steam that is blown out from the blowout outlets of each of the manifolds and passes the respective one of the moisture separating elements is removed from the steam,
the steam from which the moisture is removed flows to the steam outlet, and
the moisture passes from the drain flow path through the drain path to be led to the drain outlet.

11. The moisture separator according to claim 10, further comprising:
a heating tube inserted from another end of the shell in the longitudinal direction above of the manifolds; and
at least two second dividing walls fixed to opposite sides in the shell, each of the second dividing walls and a respective one of the moisture separating elements dividing a steam supply space from a steam discharging space,
wherein the steam from which the moisture is removed by passing the moisture separating elements flows from the steam discharging space to contact and be heated by the heating tube to the steam outlet.

* * * * *